(12) United States Patent
Chavez-Pirson et al.

(10) Patent No.: US 8,995,802 B2
(45) Date of Patent: *Mar. 31, 2015

(54) IR HEAVY METAL OXIDE GLASSES

(71) Applicant: NP Photonics, Inc., Tucson, AZ (US)

(72) Inventors: Arturo Chavez-Pirson, Tucson, AZ (US); Daniel Larry Rhonehouse, Tucson, AZ (US); Dan T. Nguyen, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,545

(22) Filed: Jul. 14, 2014

(65) Prior Publication Data

US 2015/0057142 A1 Feb. 26, 2015

Related U.S. Application Data

(63) Continuation of application No. 13/888,278, filed on May 6, 2013, now Pat. No. 8,818,160, which is a continuation-in-part of application No. 13/745,028, filed on Jan. 18, 2013, now Pat. No. 8,805,133.

(51) Int. Cl.
*G02B 6/00* (2006.01)
*C03B 37/023* (2006.01)
(Continued)

(52) U.S. Cl.
CPC ............ *C03C 13/048* (2013.01); *C03C 2213/00* (2013.01); *C03C 4/0071* (2013.01); *C03C 3/253* (2013.01)
USPC ............. 385/14; 385/122; 385/123; 385/141; 385/142; 385/143; 385/145; 65/376; 65/378; 65/385; 65/388; 65/389; 501/41; 501/42; 428/375

(58) Field of Classification Search
CPC ...... C03C 13/048; C03C 3/122; C03C 3/253; C03C 3/23; C03C 4/0071; C03C 13/04; C03C 13/042; C03C 13/043; C03C 13/046; C03C 25/107; C03C 3/062; C03C 3/07; C03C 3/14; C03C 4/10; C03B 2201/78; C03B 2203/12; C03B 2203/14; C03B 2203/16; C03B 2203/42; C03B 2205/10; C03B 37/02781; C03B 6/02328; C03B 6/02347
USPC ............ 385/122–123, 141–145; 65/376, 378, 65/385, 388–390; 501/41–42; 428/375
See application file for complete search history.

(56) References Cited

U.S. PATENT DOCUMENTS 3,883,357 A 5/1975 Cooley
5,093,288 A 3/1992 Aitken et al.
(Continued)

FOREIGN PATENT DOCUMENTS

DE 3125299 * 5/1982 .............. C03C 3/30
DE 3125299 A1 5/1982
GB 2378700 A * 2/2003 .............. C03C 3/12

OTHER PUBLICATIONS

Chavez-Pirson et al., Tourite Glass and Fiber Development for Mid-IR Transport and Supercontinuum Applications, Photonics Soceity Summer Topical Meeting Series, 2011, IEEE, p. 91.
(Continued)

*Primary Examiner* — Ryan Lepisto
*Assistant Examiner* — Guy Anderson
(74) *Attorney, Agent, or Firm* — Eric A. Gifford

(57) ABSTRACT

An IR supercontinuum source for generating supercontinuum in the MIR or possibly LWIR spectral bands comprises a supercontinuum fiber formed from a heavy metal oxide host glass having low optical loss and high non-linearity over the spectral band that is stable, strong and chemically durable. The supercontinuum fiber is suitably a depressed inner clad fiber configured to support only single transverse spatial mode propagation of the pump signal and supercontinuum. The source suitably includes a tapered depressed inner clad fiber to couple the pump signal into the supercontinuum fiber. The source may be configured as an "all-fiber" source.

19 Claims, 17 Drawing Sheets

| Batch Constituent | Phonon Energy Peak (cm-1) | Fundamental Absorption Wavelength (microns) | 2nd Phonon (microns) | 3rd Phonon (microns) | 4th Phonon (microns) | 5th Phonon (microns) |
|---|---|---|---|---|---|---|
| $B_2O_3$ | 1400 | 7.1 | 3.6 | 2.4 | 1.8 | 1.43 |
| $P_2O_5$ | 1200 | 8.3 | 4.2 | 2.8 | 2.1 | 1.67 |
| $SiO_2$ | 1100 | 9.1 | 4.5 | 3.0 | 2.3 | 1.82 |
| $WO_3$ | 925 | 10.8 | 5.4 | 3.6 | 2.7 | 2.16 |
| $GeO_2$ | 900 | 11.1 | 5.6 | 3.7 | 2.8 | 2.22 |
| $Nb_2O_5$ | 860 | 11.6 | 5.8 | 3.9 | 2.9 | 2.33 |
| $TeO_2$ | 650 | 15.4 | 7.7 | 5.1 | 3.8 | 3.08 |
| Fluoride | 600 | 16.7 | 8.3 | 5.6 | 4.2 | 3.33 |
| Ta2O5 | 550 | 18.2 | 9.1 | 6.1 | 4.5 | 3.64 |
| Ga2O3 | 500 | 20.0 | 10.0 | 6.7 | 5.0 | 4.00 |
| $La_2O_3$ | 450 | 22.2 | 11.1 | 7.4 | 5.6 | 4.44 |
| ZnO | 235 | 42.6 | 21.3 | 14.2 | 10.6 | 8.51 |
| Bi2O3 | 235 | 42.6 | 21.3 | 14.2 | 10.6 | 8.51 |
| BaO | 200 | 50.0 | 25.0 | 16.7 | 12.5 | 10.00 |
| PbO | 180 | 55.6 | 27.8 | 18.5 | 13.9 | 11.11 |

50 →

(51) Int. Cl.
*C03C 3/12* (2006.01)
*D02G 3/00* (2006.01)
*C03C 13/04* (2006.01)
*C03C 4/00* (2006.01)
*C03C 3/253* (2006.01)

(56) References Cited

U.S. PATENT DOCUMENTS

| | | | |
|---|---|---|---|
| 5,305,414 | A | 4/1994 | Higby et al. |
| 5,364,434 | A | 11/1994 | Sanghera et al. |
| 5,796,903 | A | 8/1998 | Tran |
| 6,194,334 | B1 | 2/2001 | Aitken et al. |
| 6,529,675 | B1 | 3/2003 | Hayden et al. |
| 6,656,859 | B2 | 12/2003 | Aitken et al. |
| 6,760,526 | B2 | 7/2004 | Ellison et al. |
| 6,841,792 | B2 | 1/2005 | Bynum et al. |
| 6,898,359 | B2 | 5/2005 | Soljacic et al. |
| 7,016,593 | B2 | 3/2006 | Hewak et al. |
| 7,033,966 | B2 | 4/2006 | Kobayashi et al. |
| 7,142,756 | B2 | 11/2006 | Anderson et al. |
| 7,285,509 | B2 | 10/2007 | Bayya et al. |
| 7,519,253 | B2 * | 4/2009 | Islam .................. 385/122 |
| 7,873,251 | B2 | 1/2011 | Bayya et al. |
| 8,055,108 | B2 * | 11/2011 | Islam .................. 385/122 |
| 8,120,778 | B2 | 2/2012 | Fermann et al. |
| 8,159,742 | B2 | 4/2012 | Dong et al. |
| 8,624,214 | B2 * | 1/2014 | Mikawa et al. .......... 257/2 |
| 8,624,215 | B2 | 1/2014 | Hewak et al. |
| 2003/0045421 | A1 * | 3/2003 | Burger et al. ............ 501/41 |
| 2003/0049003 | A1 | 3/2003 | Ahmad et al. |
| 2003/0059179 | A1 | 3/2003 | Jiang et al. |
| 2006/0104582 | A1 | 5/2006 | Frampton et al. |
| 2007/0181867 | A1 * | 8/2007 | Hewak et al. ............. 257/4 |
| 2008/0039309 | A1 * | 2/2008 | Wolff et al. ............. 501/46 |
| 2010/0108886 | A1 * | 5/2010 | Shaw et al. .......... 250/339.08 |
| 2011/0274924 | A1 * | 11/2011 | Jiang et al. ............ 428/375 |
| 2012/0205352 | A1 | 8/2012 | Fermann |
| 2012/0236314 | A1 * | 9/2012 | Fermann et al. ......... 356/479 |
| 2012/0239013 | A1 * | 9/2012 | Islam ................... 606/3 |
| 2012/0261345 | A1 * | 10/2012 | Hassler et al. .......... 210/669 |
| 2012/0327959 | A1 | 12/2012 | Fermann et al. |
| 2013/0188240 | A1 * | 7/2013 | Shaw et al. ............ 359/326 |
| 2014/0076404 | A1 * | 3/2014 | Tan et al. .............. 136/263 |

OTHER PUBLICATIONS

O'Donnell et al., Fluorotellurite glasses with improved mid-infrared transmission, Journal of Non-Crystalline Solids 331 (2003) 48-57.

Zorin et al., Microinhomogeneities in Tellurite Glasses, Inorganic Materials, vol. 41, No. 7, 2005. pp. 775-778. Translated from Neorganicheskie Materialy, vol. 41, No. 7, 2005, pp. 881-885.

Eroni et al., Evaluation of the third-order nonlinear optical properties of tellurite glasses by thermally managed eclipse Z-scan, Journal of Applied Physics 105, 024512 2009.

CorActive Specialty Optical Fiber Manufacturer Infrared Fiber Products, Product Description, Copyright 2010-2011, CorActive High-Tech Inc.

Massera et al., Processing of tellurite-based glass with low OH content, j. Am. Ceram. Soc. 1-7 (2010).

Li et al., Energy transfer and 1.8m emission in Tm3+/Yb3+ codoped lanthanum tungsten tellurite glasses, Journal of Alloys and Compounds 504 (2010) 573-578.

Ebendorff-Heidepriem et al. Extruded tellurite glass and fibers with low OH content for mid-infrared applications, Optical Materials Express, vol. 2, Issue 4, pp. 432-442 (2012).

El-Mallawany et al., Volume and thermal studies for tellurite glasses, J Mater Sci (2010) 45:871-387.

Liao et al., Preparation and characterization of new fluorotellurite glasses for photonics application, Journal of Non-Crystalline Solids 355 (2009) 447-452.

Feng et al., Tungsten-tellurite glass: a new candidate medium for Yb3+ doping, Journal of Non-Crystalline Solids 256&257 (1999) 372-377.

Lezal et al., Chalcogenide glasses for optical and photonics applications, Journal of Optoelectronics and Advanced Materials, vol. 6, No. 1, Mar. 2004, p. 133-137.

Marie-Laure Anne et al., Chalcogenide glass optical waveguides for infrred biosensing, www.mpdi.com/journal/sensors Sensors 2009, 9, 7398-7411.

* cited by examiner

| Batch Constituent | Phonon Energy Peak (cm-1) | Fundamental Absorption Wavelength (microns) | 2nd Phonon (microns) | 3rd Phonon (microns) | 4th Phonon (microns) | 5th Phonon (microns) |
|---|---|---|---|---|---|---|
| $B_2O_3$ | 1400 | 7.1 | 3.6 | 2.4 | 1.8 | 1.43 |
| $P_2O_5$ | 1200 | 8.3 | 4.2 | 2.8 | 2.1 | 1.67 |
| $SiO_2$ | 1100 | 9.1 | 4.5 | 3.0 | 2.3 | 1.82 |
| $WO_3$ | 925 | 10.8 | 5.4 | 3.6 | 2.7 | 2.16 |
| $GeO_2$ | 900 | 11.1 | 5.6 | 3.7 | 2.8 | 2.22 |
| $Nb_2O_5$ | 860 | 11.6 | 5.8 | 3.9 | 2.9 | 2.33 |
| $TeO_2$ | 650 | 15.4 | 7.7 | 5.1 | 3.8 | 3.08 |
| Fluoride | 600 | 16.7 | 8.3 | 5.6 | 4.2 | 3.33 |
| Ta2O5 | 550 | 18.2 | 9.1 | 6.1 | 4.5 | 3.64 |
| Ga2O3 | 500 | 20.0 | 10.0 | 6.7 | 5.0 | 4.00 |
| $La_2O_3$ | 450 | 22.2 | 11.1 | 7.4 | 5.6 | 4.44 |
| ZnO | 235 | 42.6 | 21.3 | 14.2 | 10.6 | 8.51 |
| Bi2O3 | 235 | 42.6 | 21.3 | 14.2 | 10.6 | 8.51 |
| BaO | 200 | 50.0 | 25.0 | 16.7 | 12.5 | 10.00 |
| PbO | 180 | 55.6 | 27.8 | 18.5 | 13.9 | 11.11 |

Fig. 4a

Core Radius = a

Core Radius = a'

IR HEAVY METAL OXIDE GLASSES

CROSS-REFERENCE TO RELATED APPLICATIONS

This application claims benefit of priority under 35 U.S.C. 120 as a continuation application of co-pending U.S. patent application Ser. No. 13/888,278 entitled "IR Supercontinuum Source Using Low-Loss Heavy Metal Oxide Glasses" filed May 13, 2013, which is a continuation-in-part application U.S. patent application Ser. No. 13/745,028 entitled "Low-Loss UV To MID IR Optical Tellurium Oxide Glass and Fiber for Linear, Non-Linear and Active Devices" and filed on Jan. 18, 2013, and to the entire contents of which are incorporated by reference.

GOVERNMENT RIGHTS

This invention was made with United States Government support under Contract Number N68335-11-C-0035 with the Naval Air Warfare Center AD (LKE). The United States Government has certain rights in this invention.

BACKGROUND OF THE INVENTION

1. Field of the Invention

This invention relates to supercontinuum generation, and more particularly to an IR supercontinuum source using low-loss heavy metal oxide glasses.

2. Description of the Related Art

Broadband light sources have a wide range of applications in optical systems and particularly fiber optic systems. These sources may be used to generate wavelength division multiplexed (WDM) signals or for optical spectroscopy of materials, fiber-optic sensing, optical coherence tomography (OCT), fiber optic gyroscopes, frequency metrology, optical component testing, dispersion characterization of specialty fibers, and optical interrogation of fiber bragg gratings. Conventional broadband light sources include superluminescent semiconductor diodes, rare-earth doped ASE sources, optical parametric amplifiers, quantum cascade laser, free electron lasers and supercontinuum sources. These sources are evaluated based on many factors including output spatial mode, optical bandwidth, spectral power density, flatness of the output power over the bandwidth, the temporal pulse width, the energy per pulse, the repetition rate, the time-averaged output power over the bandwidth, the efficiency of the source, and the cost, size, weight, and reliability, In a supercontinuum source, an optical pump signal interacts non-linearly with a medium such as an optical fiber to produce new frequencies leading to significant spectral broadening of the original pump signal. The pump signal is typically injected into the medium in the form of optical pulses having pulse widths on the order of pico-seconds or femto-seconds and high peak power.

Supercontinuum generation is possible in step-index optical fiber or dispersion shifted fiber. However, to achieve maximum supercontinuum bandwidth and the lowest pump power threshold for supercontinuum generation, the pump wavelength must be near the zero dispersion wavelength (ZDW) of the fiber. The waveguide structure of the fiber may be configured to shift the ZDW of the fiber away from the zero material dispersion wavelength (ZMDW) of the bulk glass to the pump wavelength. Photonic crystal fiber (PCF) is widely used over conventional solid core/clad fiber in that the dispersion properties of PCF can be easily tailored by manipulating the microstructure.

Supercontinuum generation has been demonstrated in silica photonic crystal fiber in the visible (0.39-0.75 microns) and near infrared (NIR) (0.75-2 microns). In silica photonic crystal fiber the multiphonon edge of silica glass limits the transmission window in the IR. This, in turn, limits the extent of spectral broadening in the IR. Supercontinuum sources on the market today such as from Fianium Ltd, NKT Photonics, Leukos, provide a supercontinuum in the visible and NIR that spans from about 400 nm to about 2.2 microns.

Many applications exist for broadband sources beyond about 2 microns into the Mid IR (MIR) from 2-5 microns and possibly Long Wave IR (LWIR) above 5 microns. Mid-infrared sources are key enabling technology for various applications such as remote chemical sensing, defense communications and countermeasures, and bio-photonic diagnostics and therapeutics. Researchers have experimented with other glasses such as fluorides, oxyfluorides, chalcogenides and heavy metal oxides such as tellurium oxide to generate supercontinuum into the MIR range. The non-linearity of these glasses is typically much greater than that of silica based glasses. These researchers have demonstrated supercontinuum generation above 2 microns with these glasses. However, the losses exhibited by these glasses in the upper MIR wavelengths from about 3 to about 5 microns persist at levels that are too high for uniform and efficient supercontinuum generation. To date, no one has demonstrated a supercontinuum source that generates supercontinuum over the MIR band from about 2 to about 5 microns with sufficient flatness and time-averaged power over the band to be commercially viable.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an IR supercontinuum source that generates supercontinuum over a spectral band whose upper edge is at least 3.5 microns using low-loss heavy metal oxide glasses to form the supercontinuum fiber.

In an embodiment, this is accomplished by removing or reducing glass constituents that have unwanted absorption features below the upper edge of the IR spectral band from the core glass in the supercontinuum fiber while simultaneously providing glass stability, strength, and chemical durability. The glass formulation only includes glass constituents that provide the network former, intermediate or modifier, and any halides (for OH— reduction) and any other glass constituent (present in amounts of at least 0.2 mole percent) whose absorption wavelength corresponding to an energy of the third phonon peak is approximately at or longer than the edge of the IR spectral band. In an embodiment, the intermediate or modifier, any halide and any other constituent are selected such that their absorption wavelength corresponding to the third phonon peak is longer than that of the network former so that the glass formulation exhibits optical performance as close as possible to the theoretical limit of the network former. The glass formulation preferably includes at most only a small residual amount of halide. The pre-melt glass formulation suitably includes only a sufficient amount of halide (e.g. Fluoride) to react with and carry away the hydroxyl during the melt. A non-zero residual amount of halide in the glass indicates that substantially all of the hydroxyl is removed. A small residual amount of halide does not degrade the chemical durability of the glass nor does it lead to breakage of heavy metal oxygen bonds that would increase absorption in the IR spectral band and weaken the glass.

In an embodiment, a core heavy metal oxide glass comprises a network former of 45 to 90 mole percent of an oxide formed from Tellurium (Te), Lead (Pb), Tungsten (W), Tantalum (Ta), Bismuth (Bi), Gallium (Ga), Antimony (Sb), Arsenic (As), Germanium (Ge) or Niobium (Nb) or combinations thereof, 0.2 to 45 mole percent of an oxide formed from an intermediate of Lanthanum (La), Tungsten (W), Thallium (Tl), Yttrium (Y), Tantalum (Ta), Bismuth (Bi), Gallium (Ga), Antimony (Sb), Arsenic (As), Niobium (Nb), Germanium (Ge), Titanium (Ti) or Zirconium (Zr) or combinations thereof or a modifier Magnesium (Mg), Calcium (Ca), Strontium (Sr), Barium (Ba), Zinc (Zn), Lead (Pb) or Cadmium (Cd) or combinations thereof, and a halide of 0 to 15 mole percent. To ensure low loss in the spectral band, the network former, intermediate or modifier, and any said halide any other glass constituent (present in more than trace amounts) each have an absorption wavelength corresponding to an energy of the third phonon peak that is approximately at or longer than the edge the IR spectral band. Additionally, the heavy metal oxide glass is substantially free of Hydroxide (OH—).

In an embodiment in which the upper edge of the source's spectral band is approximately 5 microns, the core heavy metal oxide glass comprises a network former of 45 to 90 mole percent of an oxide formed from Tellurium (Te), said Tellurium oxide having an absorption feature with an absorption wavelength corresponding to an energy of the third phonon peak that is longer than 5 microns, a glass intermediate of 0.2 to 45 mole percent of an oxide formed from Lanthanum (La), a glass modifier of 0.2 to 45 mole percent of an oxide formed from Mg, Ca, Sr, Ba, Zn, Pb and Cd or combinations thereof, and a halide of 0 to 5 mole percent. The intermediate and modifier, any halide, and any other glass constituent each have an absorption wavelength corresponding to an energy of the third phonon peak that is longer than that of the Tellurium oxide. In an embodiment, the Lanthanum oxide concentration is at least 5 mole percent; the halide comprises a non-zero amount of Fluoride less than 0.5 mole percent, and the modifier MO comprises ZnO wherein said oxide glass exhibits an optical loss of less than 0.3 dB/m over a spectral sub-range from 2 microns to 4 microns, wherein the source produces an integrated average output power of at least 10 mW over 4 to 5 microns.

In an embodiment in which the upper edge of the source's spectral band is at least approximately 7 microns, the network former is a combination of lead (Pb) and bismuth (Bi) oxide.

In an embodiment in which the upper edge of the source's spectral band is at least approximately 6.5 microns, the network former is one of Pb/Bi, Pb/Ga or Pb/Ga/Bi.

In an embodiment in which the upper edge of the source's spectral band is at least approximately 5.5 microns, the network former is one of Pb/Bi, Pb/Ga, Pb/Ga/Bi or Ta/Ga.

In an embodiment in which the upper edge of the source's spectral band is at least approximately 5 microns, the network former is one of Pb/Bi, Pb/Ga, Pb/Ga/Bi, Ta/Ga, K/La/Ga or Te.

In an embodiment, the supercontinuum fiber comprises a depressed inner clad fiber configured to shift the ZDW of the fiber and support propagation of the optical pulsed pump signal in only a single transverse spatial mode to interact nonlinearly with the core glass and generate supercontinuum light over the IR spectral band that propagates in only a single transverse spatial mode.

In an embodiment, the pump produces the optical pulsed pump signal with a first mode field diameter (MFD) and the supercontinuum fiber receives the optical pulsed pump signal with a smaller second MFD. A coupler comprises a depressed inner clad fiber that is fusion spliced between the pump and supercontinuum fiber to taper the MFD from approximately the first MFD down to approximately the smaller second MFD. The diameter of the fiber core is physically tapered so that twice the radius at the input to the coupler approximately equals the first MFD and twice the radius at the output from the coupler approximately equals the second MFD. The fiber is configured with indices of refraction that define a numerical aperture to support propagation of the optical signal in only a single transverse spatial mode within the spectral band. The length of the physical taper is configured so that the MFD tapers smoothly (e.g. adiabatically) from approximately the first MFD to approximately the second MFD to reduce loss of the optical signal into the cladding as the optical signal propagates through the coupler. The fiber is further configured with index of refraction n1 and a first cladding diameter that tapers from a diameter b to b' so that the taper of the MFD approximates the physical taper of the core to reduce loss of the optical signal into the cladding as the optical signal propagates through the coupler.

In an embodiment, the supercontinuum source is configured as an all-fiber source. An all-fiber approach to generate a high power, single mode beam with extremely wide (e.g. 2 μm-5 μm) and simultaneous wavelength coverage has significant advantages in terms of reliability (no moving parts or alignment), room temperature operation, size, weight, and power efficiency.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b are respectively a table of phonon energies and absorption wavelengths for glass constituents and a diagram of the multiphonon edge;

DETAILED DESCRIPTION OF THE INVENTION

The present invention describes an IR supercontinuum source for generating supercontinuum in the MIR or possibly LWIR spectral bands. The source comprises a supercontinuum fiber formed from a heavy metal oxide host glass having low optical loss and high non-linearity over the spectral band that is stable, strong and chemically durable. The supercontinuum fiber is suitably a depressed inner clad fiber (aka a "W-fiber" or "Multi-clad fiber") configured to support only single transverse spatial mode propagation of the pump signal and supercontinuum. The source suitably includes a tapered depressed inner clad fiber to couple the pump signal into the supercontinuum fiber. The source may be configured as an "all-fiber" source.

Figure 1:
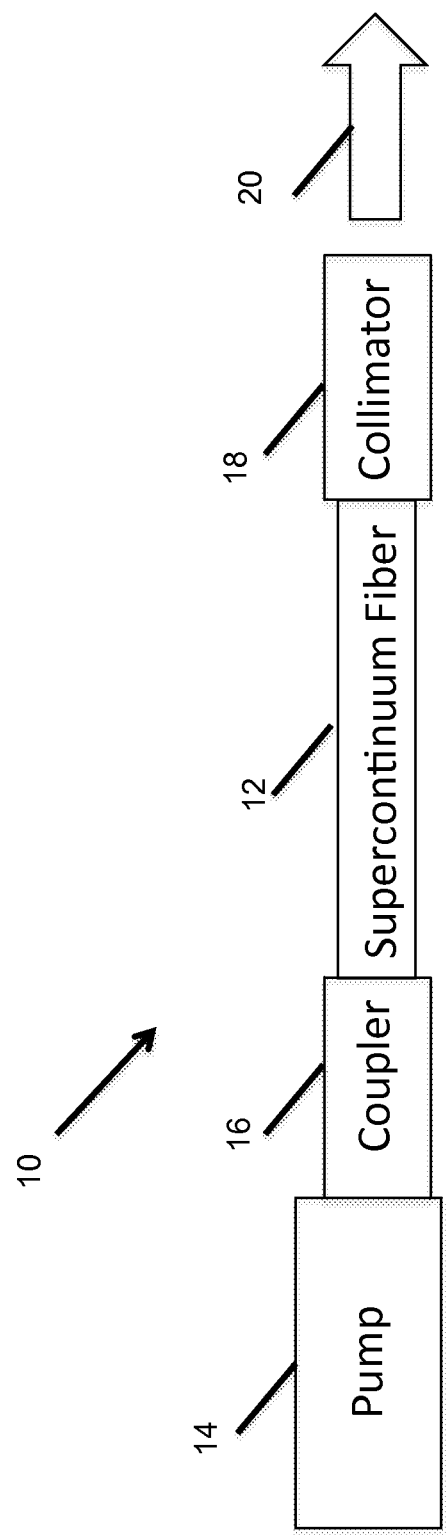
FIG. 1 is a block diagram of an IR supercontinuum source.

Referring now to FIG. 1, an embodiment of a supercontinuum source 10 comprises a supercontinuum fiber 12 having an optical non-linearity sufficient for supercontinuum generation, a pump 14 configured to produce an optical pulsed pump signal, a coupler 16 configured to couple the pulsed pump signal to the supercontinuum fiber 12, and a collimator 18. The supercontinuum fiber is configured to propagate the pulsed pump signal to interact nonlinearly with the supercontinuum fiber core to generate supercontinuum light 20 that spans a defined spectral band having an upper edge of at least 3.5 microns. The band may cover the MIR of 2-5 um, a portion of the MIR whose upper edge is at least 3.5 microns, a broader band including the MIR or a portion of the LWIR above 5 microns.

In general, supercontinuum fiber 12 must exhibit a wide transparency covering the defined spectral band (e.g. MIR), low impurity absorption in the band and low OH— incorporation, high non-linearity coefficient and high conversion efficiency. The fiber suitably supports a wide range of refractive indices based on the glass composition to enable a wide range of numerical apertures (NAs). The fiber suitably supports a wide range of fiber core/clad diameters. For example, core diameters of 1.5-25 microns and cladding diameters of 77 to 250 microns. These properties are a function of the host glass and the waveguide structure of the fiber. The network former, intermediate and/or modifier, and any halide for Hydroxide (OH—) reduction or any other glass constituent (present in more than trace amounts) are selected so that their absorbing wavelength of the energy of the third phonon peak is longer than the longest wavelength in the spectral band. Consequently the multi-phonon edge associated with the host glass is positioned above the spectral band. In other words, the "in-band" absorption of the multiphonon edge is less than a specified threshold absorption. Furthermore, the host glass is substantially free (e.g. <0.1 mole %) of Hydroxide. It is not sufficient to simply reduce the Hydroxide levels, it is important that the glass is substantially free of Hydroxide to generate supercontinuum in the MIR band. In certain embodiments the hydroxyl content will be less than 0.01 mole % or even 0.001 mole %. Details of the glass formulation and an embodiment of a Tellurium oxide glass will be described in reference to FIGS. 2, 3a-3b, 4a-4b, 5, 6, 7 and 8a-8b.

Supercontinuum fiber 12 may be a step-index optical fiber or a dispersion shifted fiber. The pump wavelength must be near the zero dispersion wavelength (ZDW) of the fiber to maximize efficiency. One option is to configure the pump to produce the optical pump signal at the ZDW of a normal step-index optical fiber. Another option is to shift the ZDW of the fiber to a desirable pump wavelength. Photonic crystal fiber (PCF) is widely used over conventional core/clad fiber in that the dispersion properties of PCF can be easily tailored by manipulating the microstructure. Alternately, a depressed inner clad fiber can be used to tailor the dispersion properties to shift the ZDW. The supercontinuum fiber may support propagation of the pump signal and supercontinuum in either single or multiple transverse spatial modes. As will be described in more detail in reference to FIGS. 9a-9b, 10a-10b and 11a-11b, an embodiment of the supercontinuum fiber comprises a single-mode (i.e. single transverse spatial mode) depressed inner clad fiber.

In general, pump 14 can be any pump capable of producing an optical pulsed pump signal in a narrow spectral band. There are many different ways to configure the pump pulse for supercontinuum generation depending on what properties of the supercontinuum source are most relevant or desirable to a given application. A few general trends are worth clarifying. The peak power of the pump is clearly important, since the origin of supercontinuum generation depends on the non-linear interaction of the pump light field with the core glass in the fiber; this depends on the intensity of the pump light in the core, and the overall effect of the nonlinear interaction benefits greatly from higher intensity. Typically, the pump generates very short optical pulses (<1 ps) with high peak power at a repetition rate in the tens of MHz. The peak power must exceed a threshold such that the nonlinear interactions with the supercontinuum fiber produce supercontinuum. The pulse width may be narrower on the order of femto-seconds or wider. The repetition rate may be higher or lower.

The center wavelength of the pump relative to the zero dispersion wavelength of the fiber determines the nature and how well the launched pump pulse generates supercontinuum. The pump may be on the short wavelength side of ZDW (normal dispersion regime), exactly at the ZDW, or on the long wavelength side of the ZDW (anomalous dispersion regime). Operating at the ZDW enables the pump pulse to propagate along the supercontinuum fiber without temporal broadening, thus enabling the pump to interact with extended sections of the fiber while maintaining a high intensity. This can result in highly efficient conversion of pump light to supercontinuum. Operating the pump in the normal dispersion regime typically results in temporal broadening, and less supercontinuum generation over a narrower spectral band; however, because of the more gradual interaction, the supercontinuum spectra may be smoother and more stable. Operating in the anomalous dispersion regime can also be favored particularly when certain types of nonlinear effects are available in the fiber core. For example, certain nonlinearities coupled with anomalous dispersion may result in soliton formation, which can be highly effective for supercontinuum generation—since solutions propagate along long lengths of fiber with little or no temporal change. This can result in efficient supercontinuum generation characterized by soliton pulses. Soliton propagation depends critically on pulse intensity, pulse width, and dispersion. Given the richness of the nonlinear effects in fibers, many different configurations of the pump pulse (peak intensity, temporal pulse shape, center wavelength) can be designed to take advantage of different properties of the supercontinuum fiber.

With this in mind, there is a general approach to optimize the pump configuration given a supercontinuum source that has wide spectral coverage and high average power in an all-fiber based architecture. A fiber pump source comprising of a short pulse (~1 ps) and high repetition rate (>20 MHz) mode-locked laser oscillator and multiple stages of fiber amplifiers, can generate high peak power that is limited by optical nonlinearities in the doped fiber amplifiers. Beyond a certain limit, the pulse becomes distorted and not effective as a pump for supercontinuum generation. So a favorable approach is to select the highest peak power that can be supported by the given fiber amplifier stages (based on silica or germanate or silicate glass), and then stretch the temporal pulse width from 1 ps to 10 ps or longer such that peak power is maintained over the stretched pulse. This will offer the highest peak power and largest pump energy available for the supercontinuum process. To maximize the average output power of the supercontinum, longer pulses with more energy and high repetition rates are used such that many high energy pulses are available for the supercontinuum generation. Practical concerns about the wavelength center are dictated by the dopants and glass used in the fiber-based pump source, and this has influence on choice of pump laser for a given supercontinuum fiber in terms of matching the ZDW of the fiber with the pump wavelength, particularly when combined with possibility of soliton propagation of the pump in the supercontinuum fiber.

Thulium doped, Holmium doped, Thulium-Holmium co-doped silica, silicate, tellurite, and germanate fibers can be used in the pump laser, and are used to fabricate mode locked or q-switched laser oscillators and amplifier stages operating in the 2-micron region. Such pumps deliver pulse widths from ps range to ns or more with high repetition rates (>20 MHz), and high average power (10's of Watts). These sources are highly practical, cost effective, and power scalable for pumping, for example, tellurite fiber based supercontinuum sources—with Watts level or more of supercontinuum average power, covering a wide spectral band from 1-micron to 5-micron in an all-fiber architecture.

In general, coupler 16 can be any mechanism for coupling the pump signal into the supercontinuum fiber including butt-coupling, free space optics or a fusion-spliced tapered depressed inner clad fiber. As will be described in more detail in reference to FIGS. 12a-12b, 13 and 14, a tapered depressed inner clad fiber can couple a single-mode pump signal to the supercontinuum fiber with very low loss, approximately 10% as opposed to 50% for free space optics.

The source 10 generates supercontinuum light 20 that spans a defined spectral band having an upper edge of at least 3.5 microns. The band may cover the MIR of 2-5 um, a portion of the MIR, a broader band including MIR or a portion of the LWIR above 5 microns. The "spectral band" is defined by a wavelength region in which the output power is generally spectrally flat (other than at the pump wavelength and near the upper and lower edges). Flatness may be defined as less than 10 dB variation over a sub-band of approximately 1500 nm. The lower and upper edges of the spectral band are defined as the shortest and longest wavelengths at which the output power is 30 dB down from the output power in the spectrally flat region.

The "spectral band" is also defined by a certain minimum output power over the band and at the lower and upper edges. The minimum output power will depend on the spectral band and the application. For example, for a source configured to generate single-mode supercontinuum over the MIR band from approximately 2 to 5 microns, the total average power from 2-5 microns should be at least 150 mW and preferably greater than 1 W. The pump-to-supercontinuum efficiency should be at least 5%. The output power requirements may be specified over different sub-bands of the spectral band. For example, for 2-5 microns the average integrated power from the visible to 1940 nm>50 mW, 2 to 3.5 microns>50 mW, 3.5 to 5 microns>50 mW and >4 microns at least 10 mW minimum.

To achieve the spectral flatness and minimum output power requirements well into and above the MIR band, the core glass of the supercontinuum fiber must exhibit very low-loss across the spectral band.

Consider a core glass that uses Tellurium oxide as a network former. In theory a supercontinuum fiber comprising an ideal Tellurium oxide core glass should support generation of supercontinuum over the MIR band from 2 to 5 microns before the absorption features of Tellurium turn off the non-linear processes that generate supercontinuum.

Figure 2:
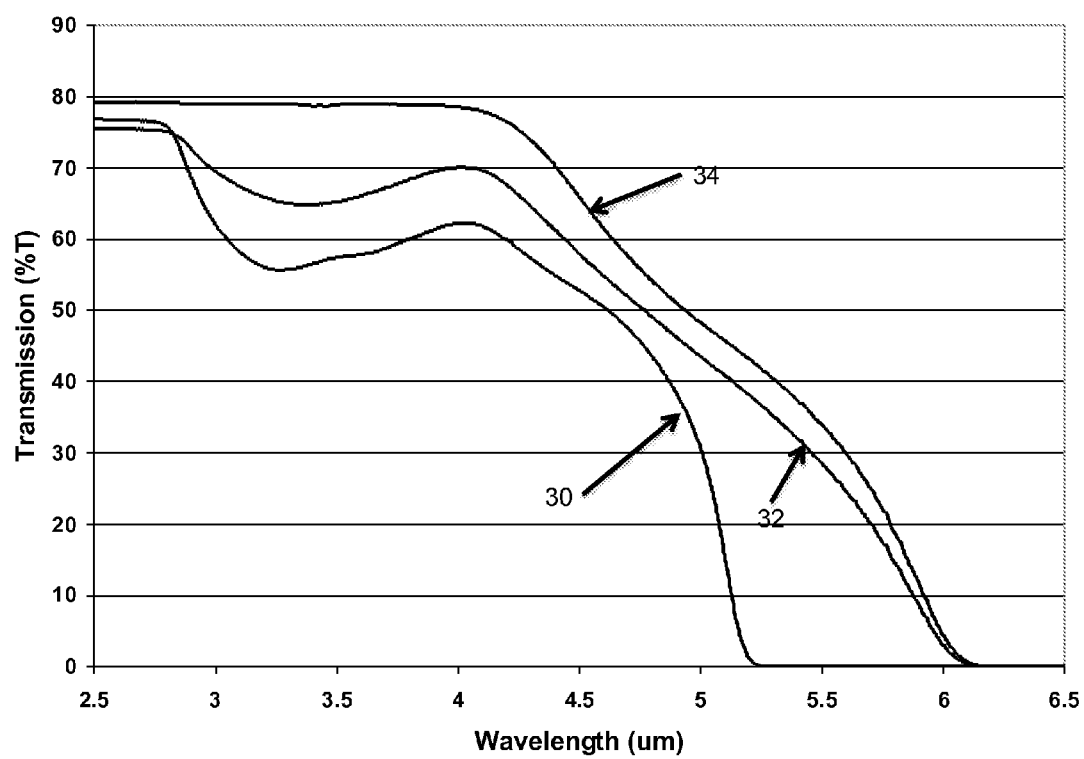
FIG. 2 is a plot of transmission versus wavelength for different heavy metal oxide glasses.

FIG. 2 plots the transmission spectra of various core glass samples to represent the evolution in our work to produce supercontinuum fiber with wide spectral coverage in the 1-micron to 5-micron range. A "control" glass TW2-2 is a conventional wet Tellurium-Tungsten glass (no OH— reduction). A first generation glass TZL10-1 is a wet Tellurium-Lanthanum glass (no OH— reduction). A second generation glass TZL11-1 is a dry Tellurium-Lanthanum glass (OH— reduced to near zero).

A transmission spectra 30 of the control glass TW2-2 shows high transmission up to approximately 2.7-micron, at which point the transmission drops primarily in the 3.3-micron band, but also in the 3.7-micron region. These transmission drops are unfavorable towards the goal of making a highly transparent core glass for supercontinuum generation in the mid IR. The absorption in the 3.3-micron band is due to hydroxide that is embedded in the glass. The absorption at 3.7-microns is due to the Tungsten that is added in the glass composition to make for a more stable glass. Tungsten has a fundamental absorption wavelength of 10.8 microns corresponding to a phonon energy peak. Although the fundamental absorption wavelength lies far above the 5 micron upper edge, Tungsten's absorption wavelength corresponding to a peak energy of its $3^{rd}$ phonon lies at about 3.6 microns. The loss at the $3^{rd}$ phonon peak is significant enough to produce the drop in the transmission spectrum. The loss at the $4^{th}$ phonon peak of 2.7 micron is sufficiently attenuated that it does not affect the transmission spectrum.

A transmission spectra 32 of the first generation glass TZL10-1 has no "dip" at 3.7 microns. The Lanthanum used to stabilize the glass has an absorption wavelength corresponding to a peak energy of its $3^{rd}$ phonon at about 7.4 micron, well above the edge of the MIR band. However, the transmission drop at 3.3-micron persists since the first generation glass still has Hydroxide incorporation.

A transmission spectra 34 of the second generation glass TZL11-1 shows high and flat transmission beyond 4-microns, decreasing only due to the multi-phonon edge of the Tellurium oxide. The various steps in glass engineering lead to a core glass with high transmission over the widest possible range and with no extrinsic absorption features apart from the fundamental multi-phonon edge of the glass. Proper selection of the glass constituents removes the absorption features from the spectral band such that the absorption loss of the multi-phonon edge is very low within the band. Aggressive reduction of OH— produces a final core glass that is substantially free of OH— (less than 0.1 mole %). OH— reduction to near zero is critical to extend high and flat transmission well into the MIR band. In certain embodiments the hydroxyl content will be less than 0.01 mole % or even 0.001 mole %.

Figure 3A:
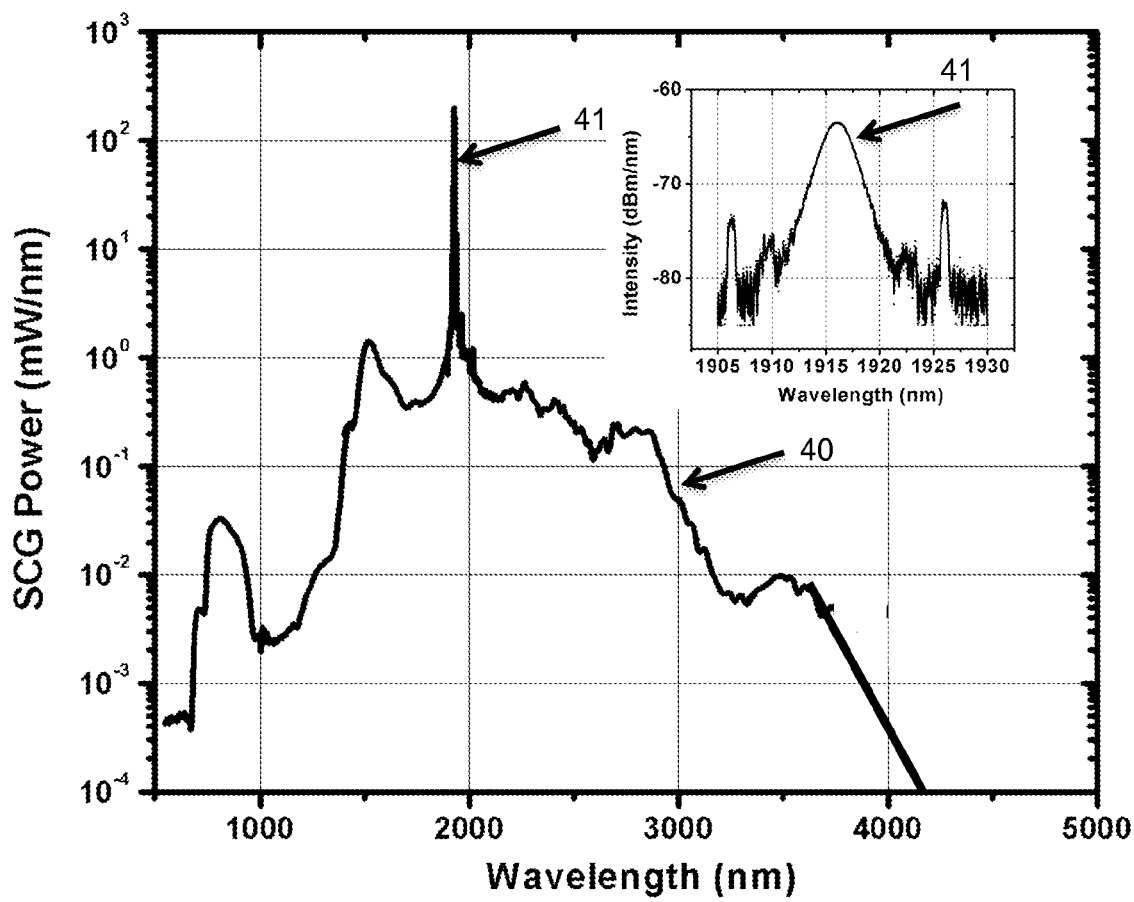
FIGS. 3a and 3b are plots of supercontinuum output power for high and low loss heavy metal oxide glasses, respectively.

The glass engineering which leads to high transparency and wide spectral coverage in the mid IR is also highly favorable for the realization of a Mid IR supercontinuum source. FIG. 3a shows a supercontinuum spectra 40 using the first generation TZL0-1 core glass. The supercontinuum spectra is relatively narrow in spectral coverage around the 1915 nm wavelength of the pump signal 41. The supercontinuum generation process extends to approximately 3-microns where it abruptly falls due primarily to the excessive absorption encountered from Hydroxide. The supercontinuum process is based on a nonlinear interaction highly dependent on the intensity of the pump light. Any absorption of pump light or supercontinuum light has the compounded effect of reducing intensity and turning off the nonlinear process as it progresses in the fiber and generates longer wavelength emission. Any absorption in the core glass will strongly limit the extent of the supercontinuum generation. The use of glass constituents to stabilize and strength the fiber that eliminate absorption features is necessary but not sufficient. The absorption mechanisms for both the glass constituents and OH— must be minimized.

Figure 3B:
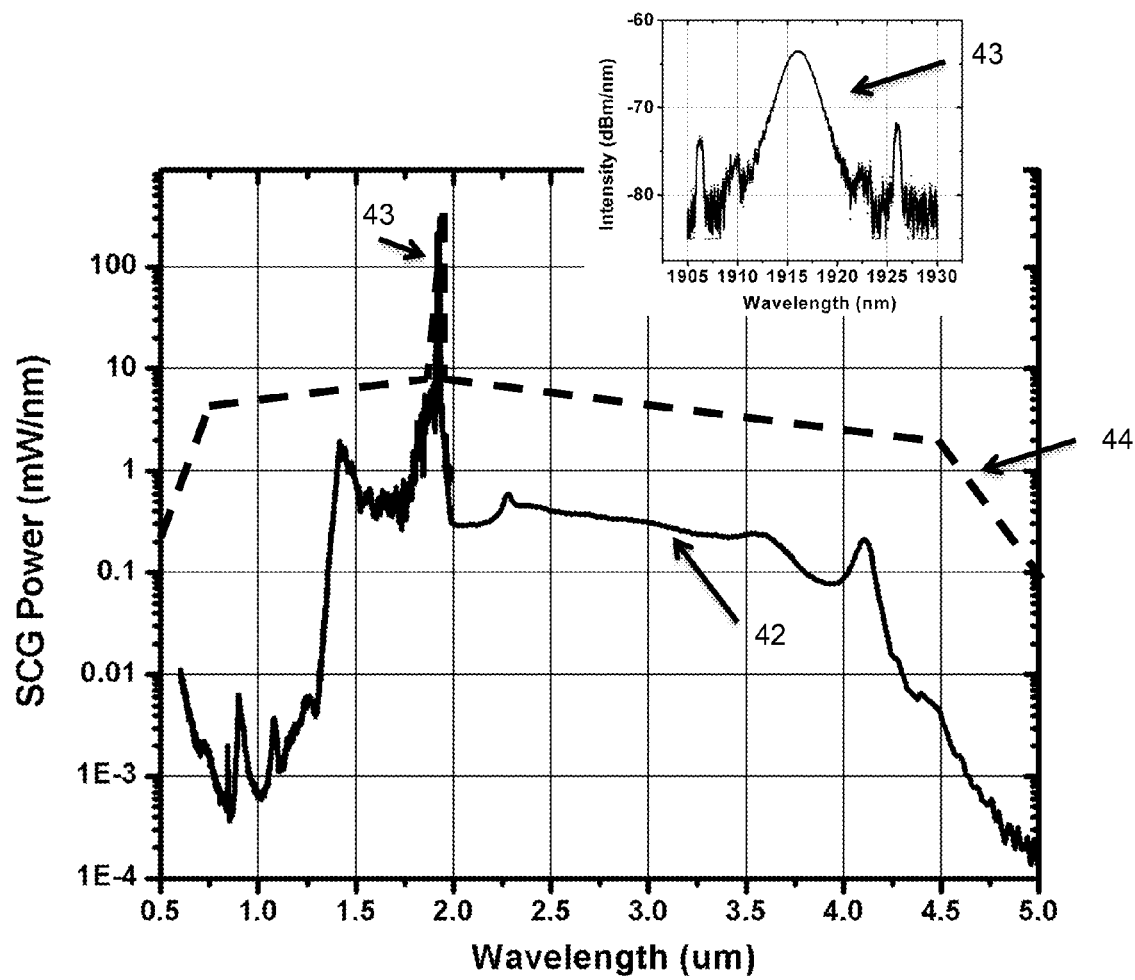

FIG. 3b shows a supercontinuum spectra 42 using the second generation TZL11-1 core glass in which both the design and processing of the glass removes all unwanted absorptions. It is clear that the upper edge of the supercontinuum is shifted to longer wavelengths and cuts off at about 5 microns—no longer limited by Hydroxide absorption, and approaching the fundamental multi-phonon edge. With increasing power of the pump signal 43 in the core, a supercontinuum spectra 44 where the spectral power density is increased further and the spectral bandwidth is extended only limited by the multi-phonon edge on the long wavelength side, and the UV band-edge on the short wavelength side. A comparison of the supercontinuum spectra for the first and second generation glasses shows that OH— reduction to near zero is critical to sustain the supercontinuum generation well into the MIR band.

As discussed, to achieve low loss well into the MIR or possibly LWIR spectral band all of the unwanted absorption mechanisms, particularly those in the defined output spectral band, must be either removed or substantially reduced without compromising glass stability, strength and chemical durability. The proper formulation of the host glass concerns both what glass constituents are included and what glass constituents are excluded or minimized.

Our work to improve the optical performance of heavy metal oxide glasses in the MIR and possibly LWIR bands without sacrificing stability, strength and chemical durability has revealed two fundamental principles. First, the oxide glass formulation should not include any glass constituents (present in more than trace amounts, e.g. >0.2 mole %) having an absorption wavelength corresponding to an energy of the third phonon peak that is not approximately at or beyond the upper edge of the spectral band. Otherwise the multi-phonon edge of the host glass may limit the transmission window. To achieve optical performance as close as possible to the theoretical limit of the network former, glass constituents for the intermediate and modifier should be selected whose absorption wavelengths at the third phonon peak are longer than that of the network former. Second, the heavy metal oxide glass must be substantially free of OH—. Optimum reduction of OH— is not achieved by using very high concentrations of halides (e.g. $ZnF_2$) during the melt that leave a large residual amount of halide (e.g. F) in the final glass composition. Such large concentrations can in fact promote the retention of moderate amounts of OH by breaking the tellurium oxide bonds creating more non-bridging oxygen and producing other unwanted absorbers in addition to the fact that high concentrations of Fluoride tend to weaken the glass and reduce its chemical durability.

Our glass formulation only includes glass constituents that provide the network former, intermediate or modifiers, and any halides (for OH— reduction) and any other glass constituent (present in more than trace amounts) whose absorption wavelength for the third phonon peak are approximately at or beyond the upper edge of the output spectral band. The glass formulation is substantially free of hydroxyl and preferably includes at most only a small residual amount of halide. The pre-melt glass formulation suitably includes only a sufficient amount of halide to react with and carry away the hydroxyl during the melt. A non-zero residual amount of halide in the glass indicates that substantially all of the hydroxyl is removed. A small residual amount does not degrade the chemical durability of the glass nor does it lead to breakage of oxygen bonds to the network former that would increase absorption in the MIR band and weaken the glass. In many cases it may also be preferred that the core glass is substantially free of sodium oxide, which can tend to bond to Hydroxide and make its removal more difficult.

The above glass formulation is specifically for the core glass of the supercontinuum fiber. The same basic glass formulation holds for the cladding glasses. However, the cladding glasses may be reformulated by varying the amounts of glass constituents or may include a second glass modifier to reduce the index of refraction. As above, the glass constituent selected for the second modifier should have an absorption wavelength of the third phonon peak approximately at or above the upper edge of the output band. In an embodiment, the second modifier M2O may be of 0.2 to 47 percent where M is selected from Li, Na, K, Rb and Cs.

FIG. 4a is a table 50 of the peak phonon energy, the corresponding inherent absorption wavelength and the absorption wavelengths corresponding to higher order phonon energies for a number of glass constituents including the common glass formers as well as certain second or third component constituents commonly used in producing stable glass formulations.

A phonon is a quantum mechanical description of an elementary vibrational motion in which a lattice of atoms or molecules uniformly oscillates at a single frequency. A phonon has an energy or quanta associated with it which can be excited by the absorption of light with corresponding energy determined by its wavelength. In solids that possess less than perfect periodic structural order, this quanta is broadened into energies above and below the theoretical peak resulting in an absorption "band" with its peak at that predicted for the theoretically perfectly ordered solid.

Figure 4B:
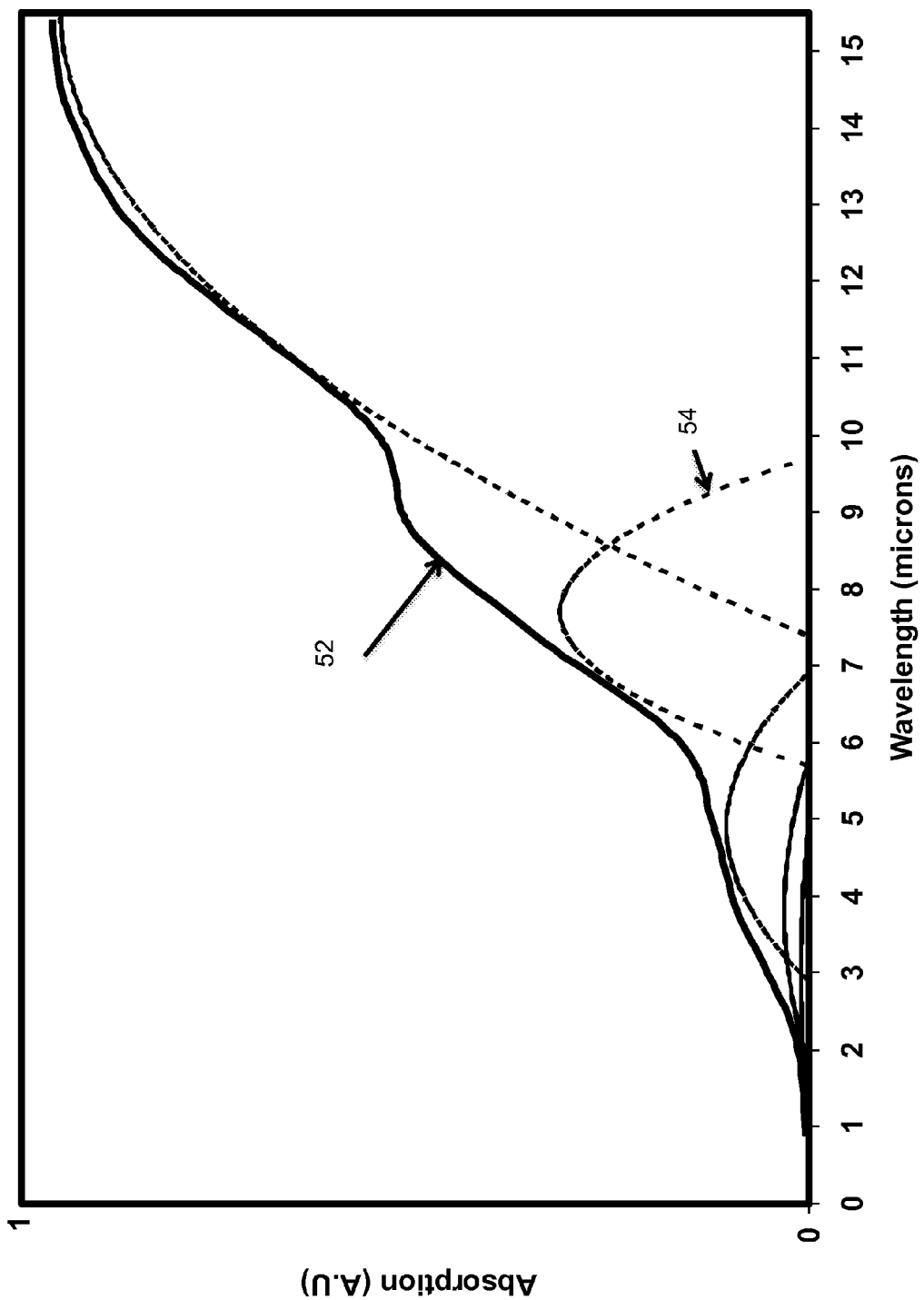
Figure 5:
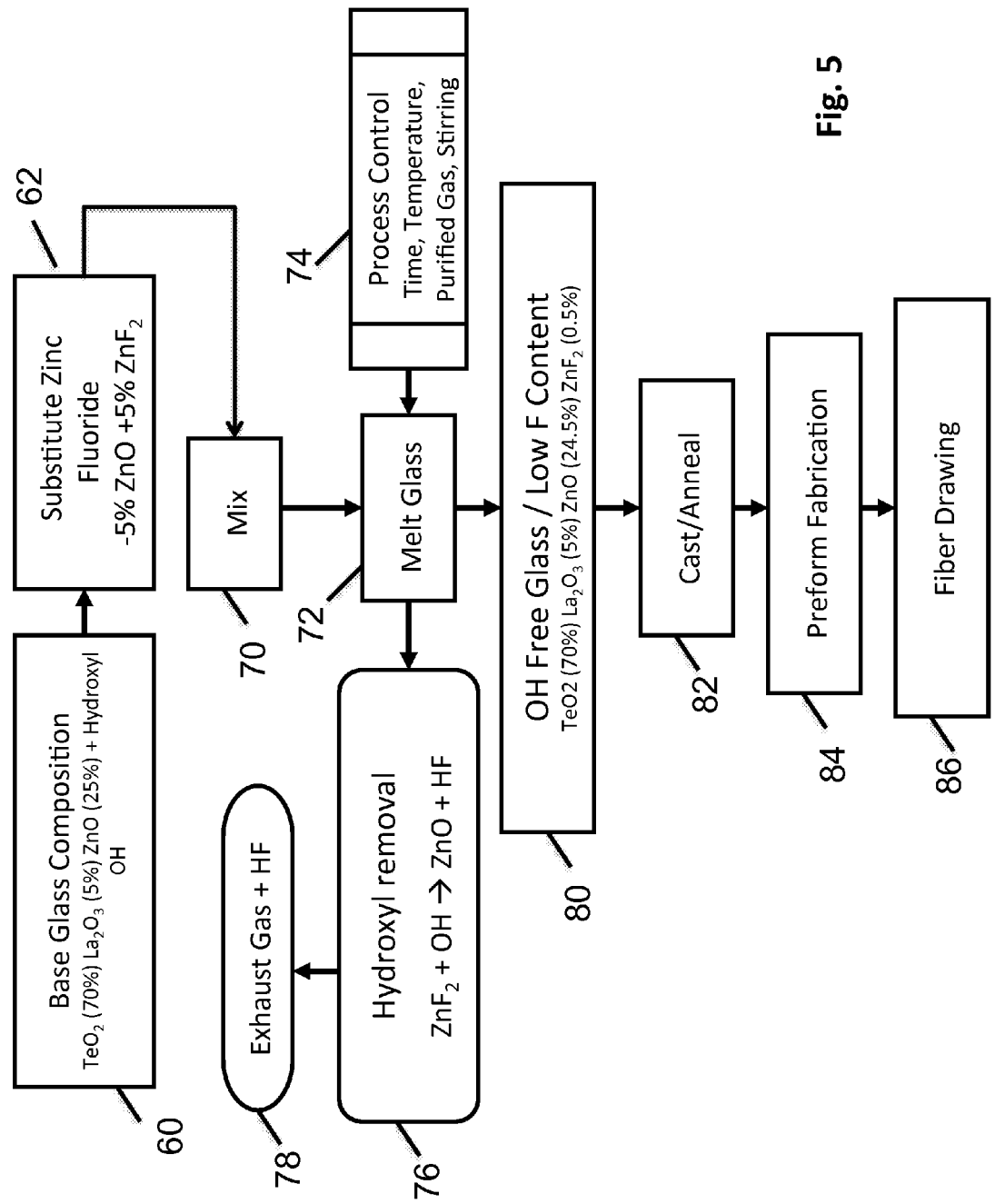
FIG. 5 is a process diagram for an embodiment of forming a bulk heavy metal oxide glass and then drawing a fiber.

As shown in FIG. 4b, a multiphonon edge 52 of such a material is a linear combination of absorption bands 54 associated with multiples of the energy at the fundamental. With each successive phonon order, the absorption strength decreases. In addition, successively higher orders of the fundamental result in bands at progressively shorter wavelengths, which often overlap in their range of wavelengths. The resulting multiphonon edge often appears as a gradual decrease in transmissive ability for a material as wavelength increases.

For a given spectral band of supercontinuum output, our challenge was to find glass formers and other glass constituents to produce a stable, strong and chemically durable glass formulation using only materials whose absorption feature are positioned outside the band. More particularly, the multiphonon edge 52 for each material should be less than a threshold absorption level over the spectral band. Based on experimentation, we have found that the multiphonon edge 52 is sufficiently low if the absorption wavelength corresponding to the third phonon peak is approximately at or above the upper edge of the desired spectral band for each glass constituent. The fourth phonon peak is sufficiently attenuated that its presence in the spectral band does not introduce significant losses. In most glass formulations, the absorption wavelength for the third phonon peak will lie strictly above the upper edge. However, for certain glasses such as W, Ge and Nb the higher order absorption bands are weaker and their absorption increases more gradually with wavelength and thus their third phonon peaks may lie slightly below the upper edge, no more than 0.5 um below the edge.

Our next challenge was to provide a final glass formulation substantially free of hydroxyl (OH) without degrading the strength, stability and chemical durability of the glass and without creating new absorbers in the IR band. As with earlier techniques, we introduce a halide, typically fluoride, into the glass composition that reacts with the hydroxyl during the melt to form volatile HF that is carried away in the furnace gas purge. Other halides such as Chloride, Bromide or Iodides may be used. The fluoride and chloride are typically introduced as a metal halide such as $ZnF_2$ or $PbF_2$.

However, unlike conventional approaches that use large amounts of $ZnF_2$ in the initial glass leaving significant amounts of $F_2$ in the final glass, our preferred approach is to limit the initial fluoride content so that only a small non-zero residual amount of $F_2$ is present in the finished glass, typically less than 1 mole % and preferably less than 0.5 mol %. To ensure effective OH reduction, it is useful that the finished glass does contain a non-zero residual amount of $F_2$. Our research has shown that a large amount of $ZnF_2$ in the initial glass does not improve OH reduction. In fact, substantial residual fluorine content in the finished glass leads to a breakage of the oxygen bonds with the network former and increased absorption. This breaking of bonds also weakens the glass structure leading to increased potential for corrosion and reduced physical strength. By limiting the initial fluoride content so that only a small residual amount of $F_2$ is present in the finished glass, the hydroxyl is removed without breaking the tellurium oxygen bonds or otherwise weakening the glass structure. Even absent efforts to minimize the residual $F_2$, the content is still at most 15 mole %, and typically at most 5 mole %, which is less than conventional approaches.

In an embodiment of a supercontinuum source for generating light over an IR spectral band having an upper edge of at least 3.5 microns the core glass is formed of a heavy metal oxide glass comprising a network former of 45 to 90 mole percent of an oxide formed from Tellurium (Te), Lead (Pb), Tungsten (W), Tantalum (Ta), Bismuth (Bi), Gallium (Ga), Antimony (Sb), Arsenic (As), Germanium (Ge) or Niobium (Nb) or combinations thereof, a glass intermediate or modifier of 0.2 to 45 mole percent of an oxide formed from Lanthanum (La), Tungsten (W), Thallium (Tl), Yttrium (Y), Tantalum (Ta), Bismuth (Bi), Gallium (Ga), Antimony (Sb), Arsenic (As), Niobium (Nb), Germanium (Ge), Titanium (Ti), Zirconium (Zr), Magnesium (Mg), Calcium (Ca), Strontium (Sr), Barium (Ba), Zinc (Zn), Lead (Pb) or Cadmium (Cd) or combinations thereof, and a halide of 0 to 5 mole percent. The network former, intermediate or modifier, any said halide or any other glass constituent of at least 0.2 mole-percent each have an absorption wavelength corresponding to an energy of the third phonon peak that is approximately at or longer than the edge of the IR spectral band. The heavy metal oxide glass is substantially free of Hydroxide (OH—).

To achieve a spectral band that is only limited by the multiphonon edge of the network former, the glass formulation includes only an intermediate, modifier, any halide and any other glass constituent whose absorption wavelength corresponding to an energy of the third phonon peak is longer than that of the network former.

In an embodiment in which the upper edge of the source's spectral band is at least approximately 7 microns, the network former is a combination of lead (Pb) and bismuth (Bi) oxide.

In an embodiment in which the upper edge of the source's spectral band is at least approximately 6.5 microns, the network former is one of Pb/Bi, Pb/Ga or Pb/Ga/Bi.

In an embodiment in which the upper edge of the source's spectral band is at least approximately 5.5 microns, the network former is one of Pb/Bi, Pb/Ga, Pb/Ga/Bi or Ta/Ga.

In an embodiment in which the upper edge of the source's spectral band is at least approximately 5 microns, the network former is one of Pb/Bi, Pb/Ga, Pb/Ga/Bi, Ta/Ga, K/La/Ga or Te.

An embodiment of a process for making a bulk finished glass and using a rod-in-tube technique to draw fiber from the finished glass is described in FIG. 4. A base glass composition is defined (step 60). In this example, the base glass composition includes $TeO_2$ (70%), $La_2O_3$ (5%) and ZnO (25%). Hydroxyl (OH—) is present as an impurity in the constituent powders, typically at a level of a fraction of a percent. Next a certain percentage, here 5%, of the ZnO is substituted with a halide, here $ZnF_2$, (step 62) that acts as the drying agent to remove the OH— during the melt. In general, the percentage of $ZnF_2$ is preferably selected such that the finished glass includes a small non-zero residual amount of the Fluoride, enough to ensure that the drying process was not starved of Fluoride and not so much as to break Tellurium Oxide bonds or to otherwise weaken the glass. In different embodiments, the halide might be as low as 0.2% and as high as 7% in the initial glass.

Once the glass formulation is set, the oxides and halides are provided, typically in the form of powders, mixed (step 70) and melted (step 72). The time, temperature, purified gas atmosphere and stirring for the glass melt are controlled (step 74). Continuous stirring of the melt has consistently produced glasses with very low hydroxyl content, less than 0.1 mole % and possibly less than 0.001 mole %. In an embodiment, the mixed powders are melted in a gold crucible in a furnace at approximately 750-950 degrees C. The atmosphere surrounding the crucible may be controlled to consist of dry inert gas, oxygen or mixtures of inert gas and oxygen. The materials within the crucible are maintained in a liquid state for sufficient time to obtain a homogenous melt. Melts can be mechanically stirred or bubbled with flowing gas to aid in homogenization and/or drying.

During the melting and mixing process the fluoride present in the melt will chemically react with residual hydrogen present in the melt (step 76). The fluoride chemical byproducts HF are purged in the exhaust gas (step 78) leaving the glass with no or a minimum amount of hydrogen. Some or all of the initially present zinc fluoride is converted to zinc oxide and the resultant glass has a lower concentration of zinc fluoride than was present in the starting materials. It is desirable to minimize the zinc fluoride concentration in the glass, since the zinc fluoride reduces the glass transition temperature and makes the glass less mechanically robust. In this example, the finished glass composition includes $TeO_2$ (70%), $La_2O_3$ (5%), ZnO (24.5%) and $ZnF_2$ (0.5%) (step 80).

Glasses obtained may be cast into preheated molds and slowly cooled (annealed) to room temperature in order to relieve stresses (step 82). The mechanical robustness of the resultant glass allows casting of ingots of arbitrary size and shape. An ingot size of approximately 1"×1"×5" is sufficiently large to be used in the fabrication of bulk optical components or preforms suitable for drawing optical fiber. Alternative methods may be used to form a glass, such as the sol-gel method.

An optical fiber can be fabricated from the tellurite glass. Optical fiber fabricated from the tellurite glass can preserve the glass intrinsic material transmission if the fiber is properly drawn. One method to form optical fiber is the rod-in-tube method. The preform consists of an inner rod surrounded by an outer tube. These shapes may be readily fabricated (step 84) from the glass ingot by conventional glass fabrication techniques, such as mechanical cutting, grinding, and polishing. An important property of the glass is its resistance to chipping and fracturing, which enables fabrication of the preforms. The preform is made by placing a rod with polished outer surfaces inside a tube with polished inner and outer surfaces. The inner rod forms the fiber core and the outer tube forms the fiber cladding. The refractive index of the core and clad glasses can be manipulated by changing the ratio of glass constituents such that any value of numerical aperture from 0 to greater than 0.4 can be obtained. One method to change the refractive index is to vary the $TeO_2$ to ZnO ratio while leaving the $La_2O_3$ level approximately constant. Optical, thermal and mechanical properties of the base glass can similarly be adjusted by manipulation of constituent ratios or by the addition of other constituents that have no unwanted absorptions, such as those listed previously.

To draw the fiber (step 86), the preform can then be placed into a furnace with a controlled atmosphere. The controlled atmosphere may be an inert gas such as nitrogen, argon or helium, or an atmosphere of oxygen or a combination of gases. The preform may then be heated to a temperature sufficient to soften the glass, causing the core rod and surrounding tube to fuse together with or without the aid of vacuum. The preform pulling temperature is above the glass transition temperature of approximately 300 C. The softened and fused glass is subsequently pulled and drawn into fiber. Care must be taken during the drawing to avoid recrystallization, which can result in the formation of scattering sites at grain boundaries. A protective coating may be applied to the outer cladding surface and the fiber spooled for convenient storage and transport. The protective coating may be a polymer, metal, carbon, or other coating material. The protective coating helps to preserve the intrinsic strength of the tellurite glass fiber. Fibers drawn from the telluride glass have demonstrated a tensile strength exceeding 50 KPSI. This high tensile strength facilitates forming a mechanically robust fiber that can be readily handled, spooled, and routed through bulkheads without breakage.

Many types of fiber structures may be made in addition to the basic single core/single clad geometry. For example, a double clad fiber such as a depressed inner clad fiber may be made by using two tubes surrounding the core. A fiber with multiple cores may be made. The fiber may include a photonic crystal structure consisting on an array of holes within the fiber. The fiber core may be designed to support either single mode or multimode operation. For single mode operation the core dimensions are typically small, no more than several times the wavelength of the light being transmitted. For a multimode fiber, the core dimensions are typically many times larger than the wavelength of the transmitted light. A fiber core diameter of 100 microns may be used although larger and smaller cores may be used depending on the application.

Alternative methods of fabricating a fiber may be used in addition to the rod-in-tube method described above. Preforms may be fabricated by vapor deposition of material on the inner surface of a polished tube. Alternatively, glass in molten form may fill the cavity of a tube. The molten glass may then be cooled and the resultant assembly used as a preform. Instead of forming the tube by mechanical methods, a tube may be formed by cooling and solidifying the outer surfaces of a glass ingot and allowing the inner molten regions to drain away.

We will now describe the glass formulation and design process for a particular embodiment of a heavy metal oxide glass that uses Tellurium (IV) oxide as the network former to provide supercontinuum over a spectral band from 2 to 5 microns.

As shown in Table 50 in FIG. 4a, Tellurium (IV) oxide has a peak phonon energy of 650 $cm^{-1}$ and a corresponding inherent absorption wavelength of 15.4 microns. Tellurium (IV) oxide has an absorption wavelength at the third phonon peak of 5.1 microns. The glass constituents Germanium (Ge), Tungsten (W) and Niobium (Nb) that are commonly used in tellurite glass for MIR applications each have an inherent absorption wavelength lower than that of Tellurium (IV) oxide, and absorbing wavelengths at their third phonon peaks less than 4 microns, hence they are not viable candidates for our oxide glass formulation. Sodium (Na) and Lead (Pb) do have absorption wavelengths above that of Tellurium (IV) oxide but are excluded for other reasons; Sodium inhibits the reduction of OH, severely lowers Tg and weakens the glass and Lead is toxic. In some cases lead may be used.

Lanthanum oxide ($La_2O_3$) in glass can impart higher glass transition temperatures, strength, and durability. Lanthanum oxide is a glass intermediate only forming glass when combined with other constituents such as one of the common glass formers Silica dioxide ($SiO_2$), Phosphorus pentoxide ($P_2O_5$), Germanium dioxide ($GeO_2$) or Boron oxide ($B_2O_3$). Glasses containing lanthanum oxide however are known to be only moderately stable over a limited range of composition. Lanthanum oxide in glass is therefore generally limited to a role as a minor constituent comprising less than a few mole percentage of a given composition. Lanthanum oxide possesses very low phonon energy and even after four phonons only absorbs at wavelengths over 5 microns. Lanthanum oxide therefore possesses very desirable characteristics of high Tg, high corrosion resistance and low UV, Vis and MIR absorption.

To form fiber by the common rod-in-tube technique, a glass preform consisting of a core rod with a polished outer surface is placed inside a tube with polished inner and outer surface and heated to a temperature at which the glass rod and tube soften and fuse to be subsequently drawn or pulled to a fiber. A common benchmark for glass stability, $\Delta T$, is defined as the difference of the peak crystallization temperature Tx and glass transition temperature Tg or $\Delta T = Tx - Tg$ as determined by the common calorimetric technique Differential Scanning Calorimetry (DSC). In general a larger $\Delta T$ is desirable with a value greater than 100 C often cited as reasonable for fiber drawing. Glasses containing only tellurium and lanthanum oxides have been made but exhibit very low values of $\Delta T$ in the range of 40 C (Mallawany J. Mater. Sci. (2010) 45: 871-887).

Typically tungsten, niobium or germanium is used to form more stable compositions with a larger value of $\Delta T$. Again by careful analysis of Table 50 one realizes tungsten, niobium or germanium containing glasses all have phonon energies larger than $TeO_2$ and will produce unwanted absorptions within only as few as three multiples of the peak phonon energy. These materials must then be eliminated from any composition for which exceptionally low loss at wavelengths shorter than that of tellurium itself is desired.

Consequently other glass constituents must be found which can stabilize the Te—La glass compositions. Oxides formed from Magnesium (Mg), Calcium (Ca), Strontium (Sr), Barium (Ba), Zinc (Zn), Lead (Pb) and Cadmium (Cd) may be used to stabilize the Te—La glass composition. Each of these oxides has an inherent absorption wavelength above that of tellurium. These oxides in combination with tellurium and lanthanum oxides form a glass over an extended compositional region. Addition of these oxides to tellurium lanthanum glass compositions leads to increased ΔT values that are greater than 100 C. A preferred embodiment may use ZnO as it has been demonstrated to form highly stable TeLaZnO glass.

The glass formulation may include various other glass constituents for other glass forming purposes such as to overcome the tendency towards crystallization and to adjust other physical, thermal and optical properties such as Tg, thermal expansion coefficient, or refractive index. Any such constituent that is present in the finished glass in other than a de minimus amount (e.g. <0.2 mole %) must not have an absorption feature with an absorption wavelength of the third phonon energy approximately at or above the IR edge of 5 microns. For example, the base glass can be modified by the addition of other alkali, alkaline earth, transition metal, or heavy metal oxides or halides including Li, K, Rb, Cs, Mg, Ba, Ca, Sr, Y, Ti, Zr, Hf, Nb, Ta, Mo, Ga, In, Tl, Pb, As, Ge, Sb and Bi.

Our next challenge was to provide a final glass formulation substantially free of hydroxyl (OH) without degrading the strength, stability and chemical durability of the glass and without creating new absorbers in the IR band. This was achieved by introducing a small amount of Fluoride into the initial glass composition. The amount of Fluoride is chosen so that at most a residual amount of $F_2$ is present in the final glass, typically less than 1 mole % and preferably less than 0.5 mol %.

Figure 6:
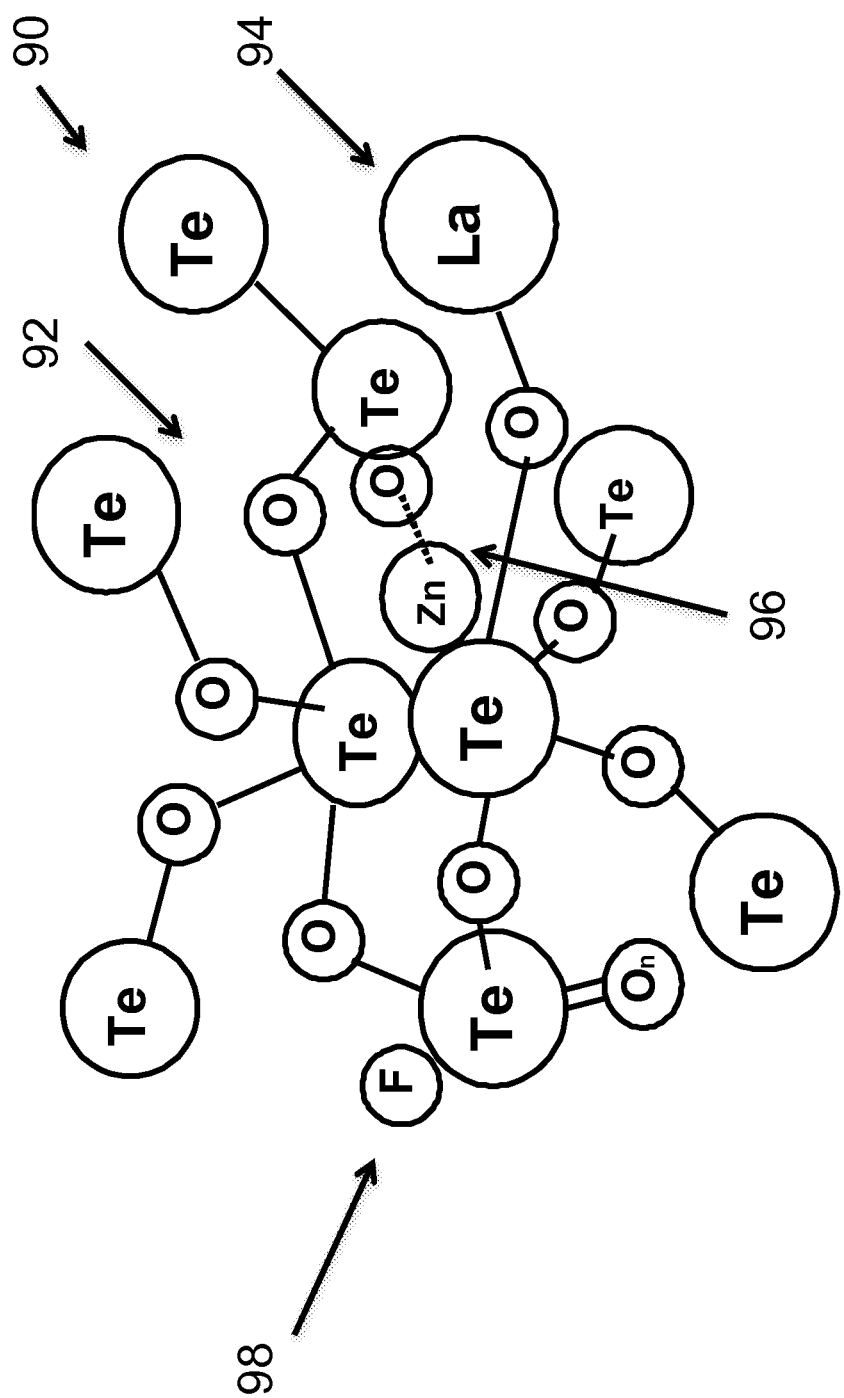
FIG. 6 is a diagram of a tellurium oxide glass composition in accordance with the present invention.

Referring now to FIG. 6, an embodiment of a heavy metal oxide glass formulation 90 for a finished core glass comprises:

a glass network former of Tellurium (IV) oxide $TeO_2$ 92 of 65 to 90 mole percent;

a glass intermediate of Lanthanum (III) oxide $La_2O_3$ 94 of 0.2 to 15 mole percent;

a glass modifier MO 96 of 0.2 to 35 mole percent where M is selected from Mg, Ca, Sr, Ba, Zn, Pb and Cd or combinations thereof;

and a halide 98 of 0 to 5 percent, wherein the oxide glass composition is substantially free of Hydroxide OH— and any other glass constituent having an absorption feature with an absorption wavelength of a third phonon peak that is not approximately at or above the upper edge of the supercontinuum. The core glass is suitably substantially free of Sodium Oxide $Na_2O$.

Once melted into a glass the various constituents become associated with other atoms in a complex way. So $TeO_2$ becomes a "chain" of Te atoms with four O atoms associated with it "$TeO_4$" groups or three oxygen "$TeO_3$" groups or something in between $TeO_{3+1}$ groups. Zinc fills in spaces between Te groups without becoming part of the "chain" and becomes only loosely associated with the oxygen or fluorine. Zn changes the shape of neighboring $TeO_4$ groups forming $TeO_{3+1}$ groups with a distorted electronic cloud. F or O from the Zn move to a position that compensates for the distorted electronic cloud to maintain electrical balance.

In an embodiment, the concentration of Lanthanum (III) oxide $La_2O_3$ 94 is 5-15 mole percent. In another embodiment, the concentration is 8-10%. In general, we have found that it is advantageous for the concentration of Lanthanum (III) oxide to be as high as possible consistent with forming a stable glass. Lanthanum (III) oxide increases the glass transition temperature and improves glass mechanical properties.

In an embodiment, the glass modifier MO 96 is ZnO. In an embodiment, the concentration of ZnO is a combination of ZnO provided in the initial glass pre-melt and ZnO that is formed by converting $ZnF_2$ or ZnCl during hydroxyl reduction. In an embodiment, the concentration of ZnO is at least 10 mole percent. Of the possible modifiers, ZnO has been found to produce the most stable glass with Lanthanum (III) oxide, which is particularly important for fiber drawing using the rod-in-tube technique.

In an embodiment, the halide 98 is present as a non-zero amount less than 1 mole percent, and preferably less than 0.5%. The presence of a non-zero amount of the halide ensures that the hydroxyl reduction process during the melt was not starved for a halide to react with the hydroxyl. A small amount of halide ensures that the tellurium oxide bonds are not broken and that the glass is not otherwise weakened by the presence of a large concentration of halide. In an embodiment, the halide 98 is Fluoride.

Figure 7:
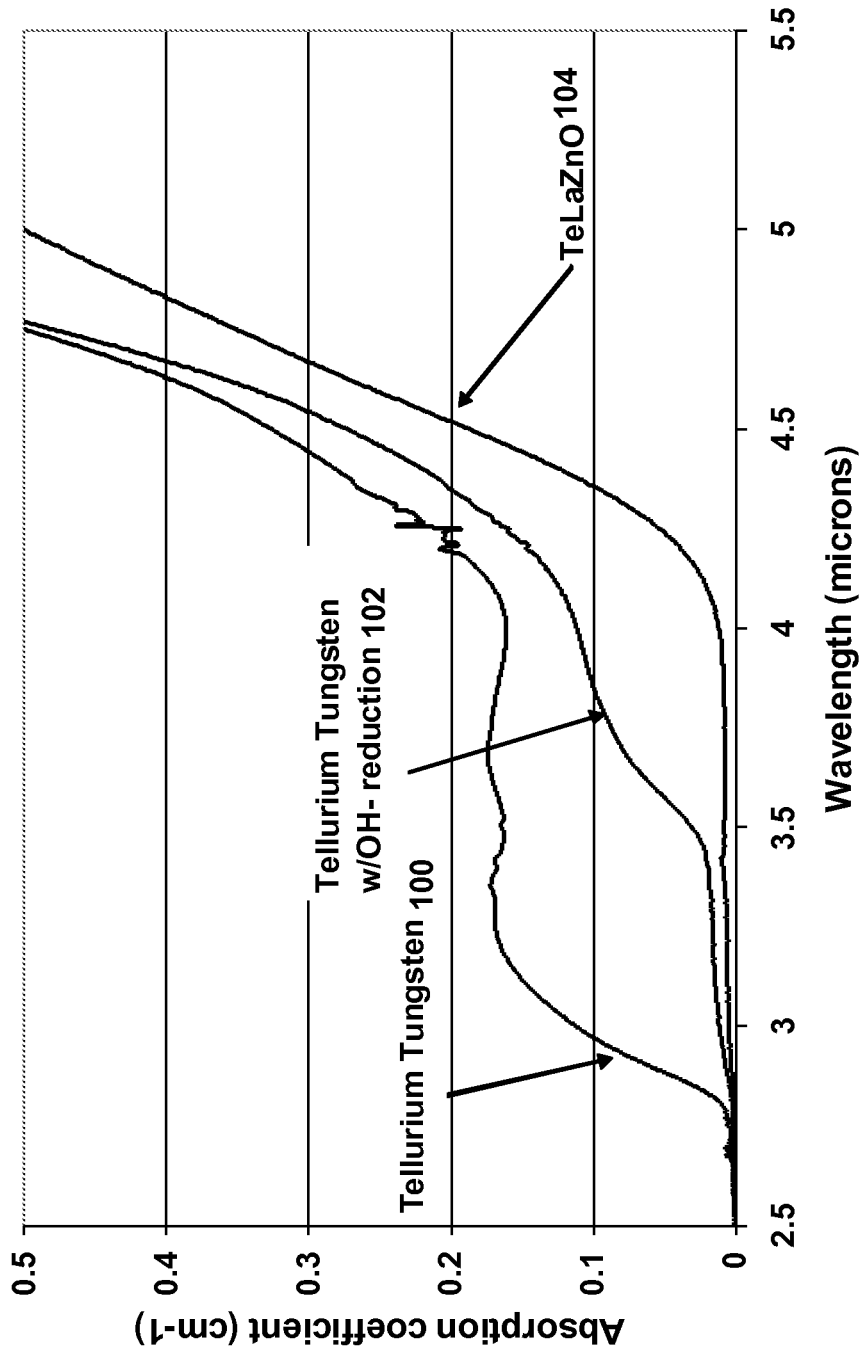
FIG. 7 is a plot of absorption coefficient versus wavelength for different tellurium oxide glasses.

FIG. 7 plots the absorption coefficient versus wavelength for three different glasses: Tellurium Tungsten 100, Tellurium Tungsten w/OH— reduction 102 and TeLaZnO w/OH— reduction 104 illustrating first the improvement in optical performance of effective OH— reduction and then elimination of any passive constituents whose inherent absorption wavelength is shorter than that of Tellurium (IV) oxide. The absorption coefficient is a measure of the ratio of transmitted power to incident power. Tungsten is a standard glass former for Tellurium (IV) Oxide that is well known to form strong, stable and chemically durable glasses. However, as shown in FIG. 4a Tungsten has an inherent absorption wavelength shorter than that of Tellurium (IV) Oxide and the absorption wavelength of Tungsten corresponding to the third phonon peak lies below 5 microns.

As shown, the Tellurium Tungsten glass 100 starts showing some absorption around 2.7 microns that becomes significant at about 3.0 microns. This is due to the absorption features of hydroxyl (OH—). The Tellurium Tungsten glass w/OH-reduction 102 starts showing some absorption around 3.0 microns that becomes significant at about 3.7 microns. The effective reduction of OH— (without breaking the $TeO_2$ bonds) does significantly extend the bandwidth over which the absorption coefficient remains low. However, the presence of Tungsten (W) introduces an absorber at 3.6 microns due to the $3^{rd}$ phonon energy. These higher order terms result in significant absorption. The TeLaZnO w/OH— reduction glass 104 starts showing some absorption around 4.0 microns that becomes significant at about 4.4 microns, thus extending the low loss bandwidth well into the MIR. Because of the "log" scale, these changes in the absorption coefficient are dramatic and have significant effects on loss in supercontinuum fibers having lengths in the meters to tens of meters.

In an embodiment, the oxide glass has an optical loss of less than 2 dB/m over the entire spectral range from 0.6 microns to 4.5 microns. The glass exhibits an optical loss of less than 0.5 dB/m over a spectral sub-band from 0.65 to 4.2 microns. The glass exhibits an optical loss of less than 0.3 dB/m over a sub-band from 2 microns to 4 microns including an optical loss of less than 0.3 dB/m due to OH— at approximately 3 microns corresponding to the peak absorption of OH—.

Figure 8A:
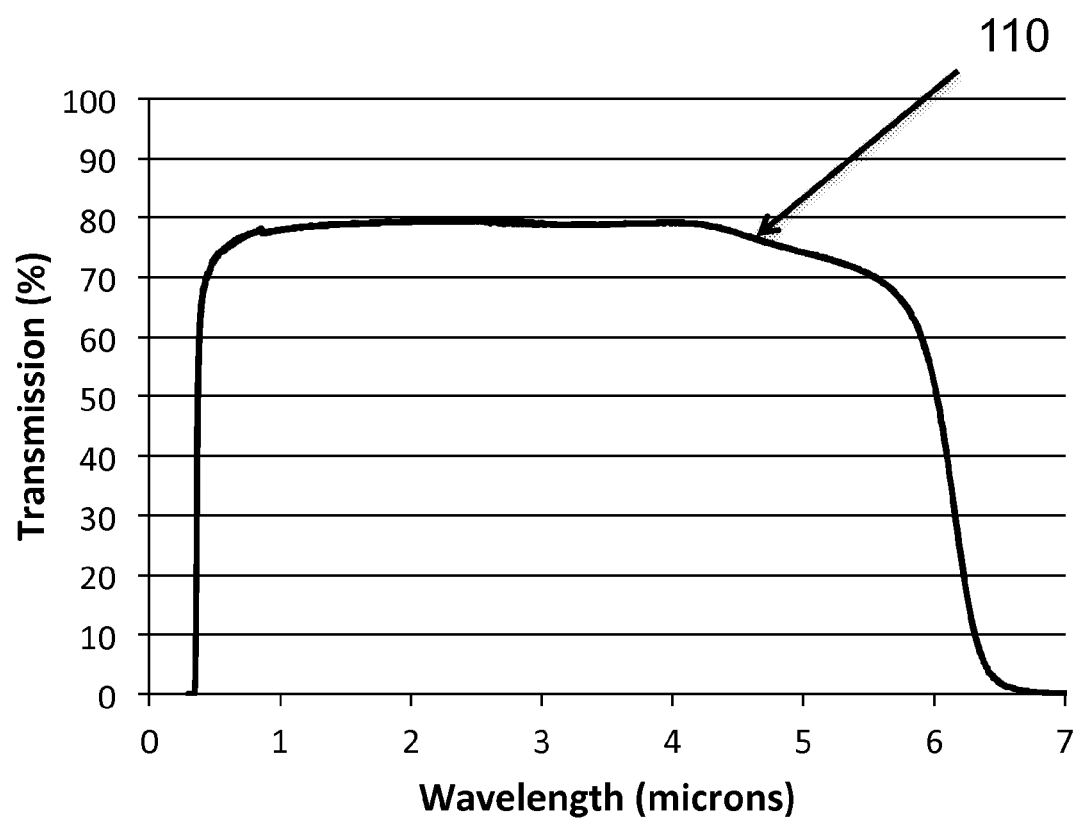
FIGS. 8a and 8b are plots of transmission and propagation loss, respectively versus wavelength for a fiber having a core tellurium oxide glass composition in accordance with the present invention.
Figure 8B:
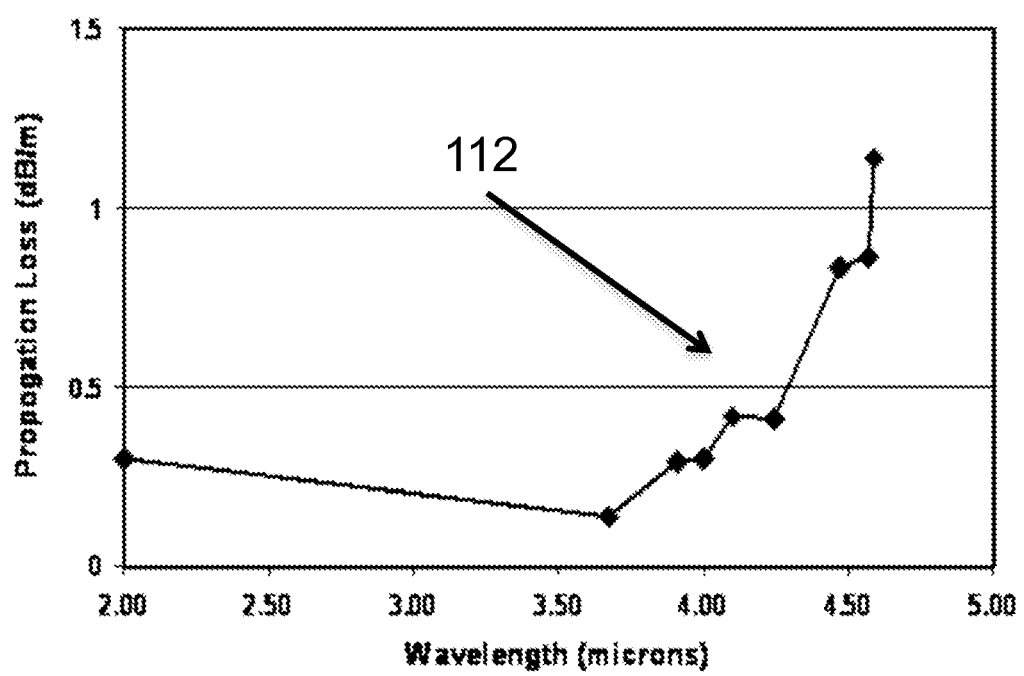
Figure 9A:
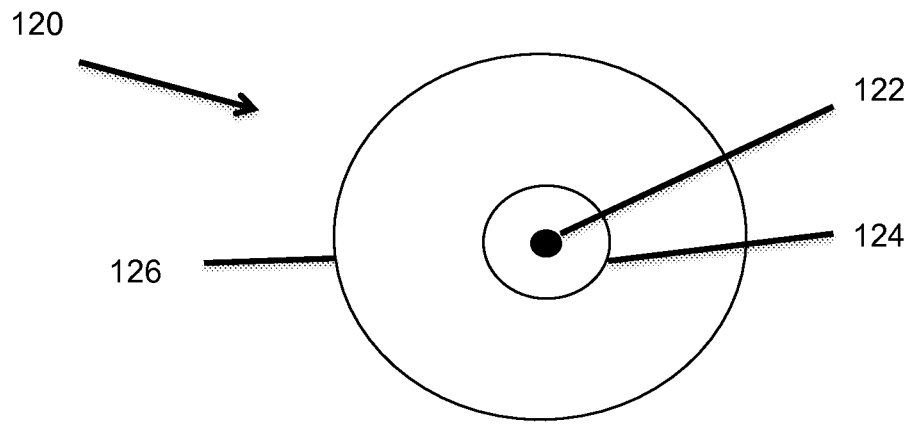
FIGS. 9a and 9b are diagrams of an embodiment of supercontinuum fiber having a depressed inner clad configuration.
Figure 9B:
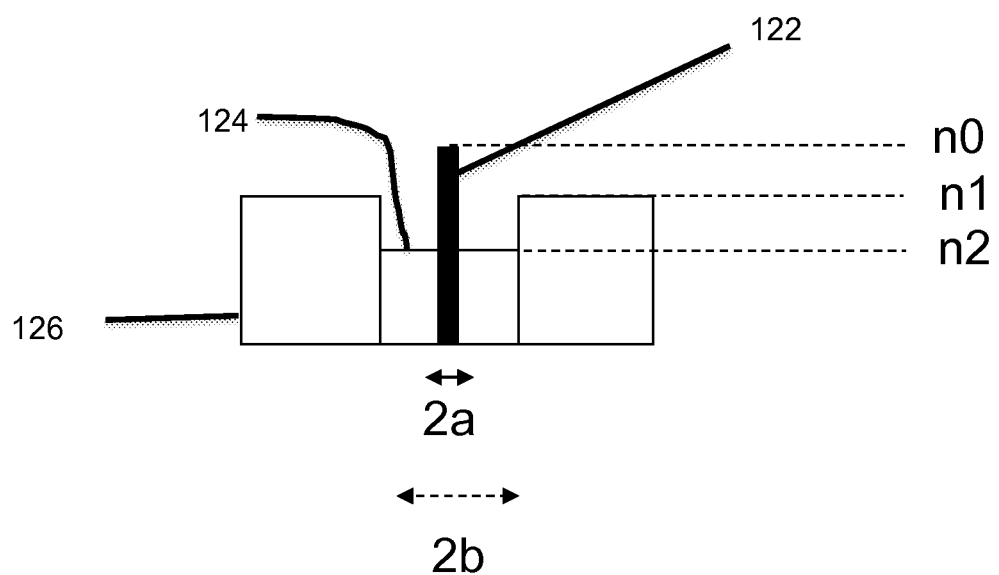

FIGS. 8a and 8b show the transmission and propagation loss versus wavelength for an exemplary tellurite glass. In this example, the finished glass formulation comprises $TeO_2$ (70%), La$_2$O$_3$ (5%), ZnO (24.5%) and ZnF$_2$ (0.5%). The bulk glass and fiber were formed using the processes described above.

FIG. 8a shows the transmission spectrum 110 of a 1.5 mm thick tellurite glass sample prior to fiber draw. The measurement includes the Fresnel reflective losses, so the maximum transmission value is only about 80%. In a broad spectral region from approximately 600 nm to 4000 nm the glass has very low absorption losses. In the short wavelength region the glass maintains some level transmission well into the UV. For example, the sample transmission does not drop to 5% until 353 nm. In the long wavelength region the glass maintains some level of transmission well into the mid-infrared. The absorption is negligible until approximately 4000 nm. The region from approximately 4000 nm to 5500 nm shows a gradual transmission drop. Above 5500 nm the transmission roll off is steeper, but the sample transmission does not drop to 5% until 6380 nm. While in some applications the glass may be useful at shorter or longer wavelengths, most applications for the glass will be in the wavelength range of approximately 350 nm to 6400 nm. For applications that require high transmittance or long propagation lengths in the glass, the useful operating range is narrower approximately 600 nm to 4500 nm. The spectral region outside this low loss band may be useful where transmittances can be low or propagation lengths short or moderate.

FIG. 8b illustrates that low loss optical fiber can be drawn from the tellurite glass. The fiber used in this measurement had a core diameter of 70 microns and a cladding outer diameter of 170 microns. The propagation loss 112 is less than 0.5 dB/m for IR wavelengths shorter than approximately 4 microns. Since the thin sample transmission measurements show no absorption features across the near IR region, the fiber drawn from the glass maintains continuous high transmission over this entire spectral region. Propagation loss begins to rise for wavelengths longer than approximately 4 microns, consistent with the thin sample transmission measurements shown in FIG. 5a. However, the propagation loss is still less than 1.5 dB/m for wavelengths longer than 4.5 microns. Fiber with propagation losses much higher than 1.5 dB/m is still useful in applications where the fiber lengths are short or high transmission is not a requirement.

Referring now to FIGS. 9a-9b, 10a-10b and 11a-11b, in an embodiment the supercontinuum fiber may comprise a depressed inner clad fiber 120 configured to shift the ZDW of the fiber and support propagation of the optical pulsed pump signal in only a single transverse spatial mode to interact nonlinearly with the core glass and generate supercontinuum light over the IR spectral band that propagates in only a single transverse spatial mode. Depressed inner clad fiber 120 comprises a core 122 having a zero material dispersion wavelength (ZMDW), a first cladding 124 surrounding the core and a second cladding 126 surrounding the first cladding. The core, first cladding and second cladding having refractive indices n0, n1 and n2, respectively, in which n1<n2<n0. The core has a radius "a" and the first clad has a radius "b".

Fiber 120 may include additional cladding layers to enable more refined waveguide engineering, such as extending single mode coverage or dispersion shifting or dispersion flattening. In general, additional claddings can be favorable for fine-tuning the fiber design. However, there is a practical difficulty in increasing the number of claddings, since it complicates fiber fabrication. Also, there are theoretical constraints on the type and physical extent of the claddings to still be effective. The index of the additional interior claddings generally must be lower than the outermost cladding—to ensure that the overall structure is confining the light properly. Moreover, the physical extent of such additional claddings cannot continue indefinitely and still have a positive effect, since the light field has a limited lateral extent beyond which additional claddings have no impact.

The depressed inner clad fiber 120 has unique properties that are relevant to supercontinuum generation including:

(i) The light field is tightly confined in the fiber core, resulting in strong nonlinear effects in the fiber core.

(ii) The dispersion can be significantly manipulated by changing the index contrast and ratio of claddings and core. Such engineered dispersions could have zero-dispersion wavelength close to the pump wavelength; can be flattened and have much smaller values as compared to the single-clad (SC) fibers.

(iii) The fiber can be configured for single mode guidance for the pump signal and mid IR wavelengths. Lower modal losses in broad spectral region can be achieved as compared with single clad fiber.

(iv) The fiber is better than PCF in this application because it is much simpler to fabricate, has better power handling because of improved thermal heat conduction, is less sensitive to bending, is easier to fusion splice with fiber laser pump sources to enable all-fiber system, and has longer term robustness because of monolithic structure with no air holes.

When designing the depressed inner clad fiber 120, one may consider,

Pick suitable glass material for nonlinear core, and index contrasts for claddings.

SM over some wavelength range (pump, supercontinuum wavelengths).

Shift the zero dispersion to pump wavelength.

Flatten the dispersion slope.

Maximize the intensity in the core for best supercontinuum generation.

In different embodiments for generation of supercontinuum spanning the MIR from approximately 2 to 5 microns, the supercontinuum fibers are designed for single mode (SM) cut-off close to a pump wavelength in 1.8 to 2.1 micron to optimize pumping propagation in the fiber core, and for SM guidance of the entire MIR supercontinuum in the core. The criterion for SM guidance is determined by the V-number. In depressed inner clad fiber the condition for SM is:

$$V = \frac{2\pi a}{\lambda}\sqrt{n_0^2 - n_2^2} < 3.503, \quad (1)$$

and for a step-index single clad fiber, SM condition is $$V = \frac{2\pi a}{\lambda}\sqrt{n_0^2 - n_1^2} < 2.405. \quad (2)$$

In step index fibers, the condition for SM is narrower. In our design, we make use of the depressed inner clad fiber wider range of SM guidance to make the pump and supercontinuum light single mode with low modal loss by design.

In certain embodiments, the fibers have core sizes up to 5 micron, $\Delta n = n_0 - n_1$ up to 0.16, ratio of inner clad and core S=b/a from 1.5 to 4, ratio R=$\Delta n'/\Delta n$=−0.1 to −0.5 ($\Delta n'$=n1−n2).

In other embodiments, the fibers have core sizes up to 10 micron, $\Delta n = n_0 - n_1$ up to 0.4, ratio of inner clad and core S=b/a up to 5, ratio R=$\Delta n'/\Delta n$=−0.1 to −0.5 ($\Delta n'$=n1−n2).

Figure 10A:
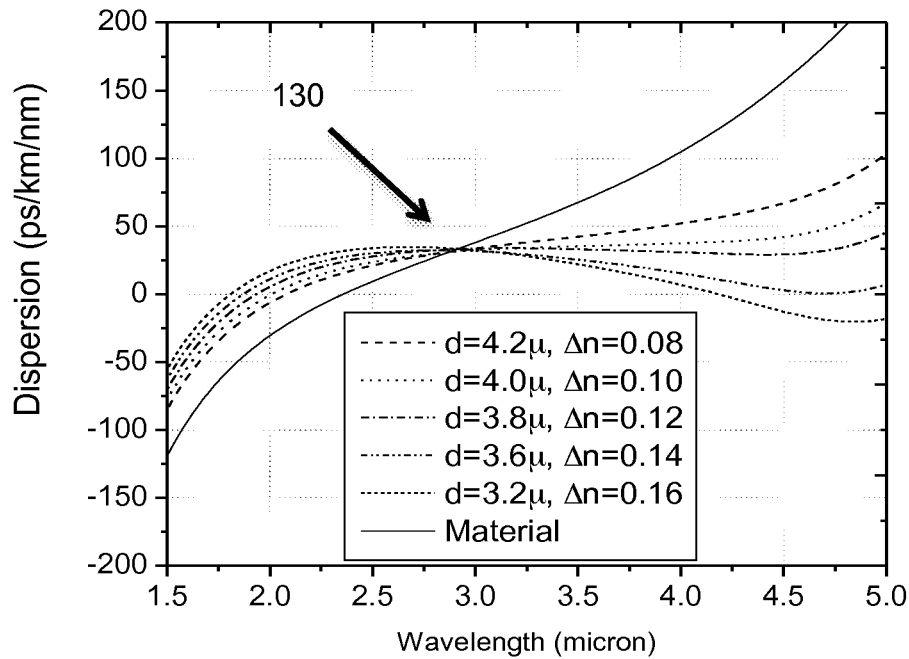
FIGS. 10a and 10b are plots illustrating the dispersion flattening and shifting properties of the depressed inner clad fiber.
Figure 10B:
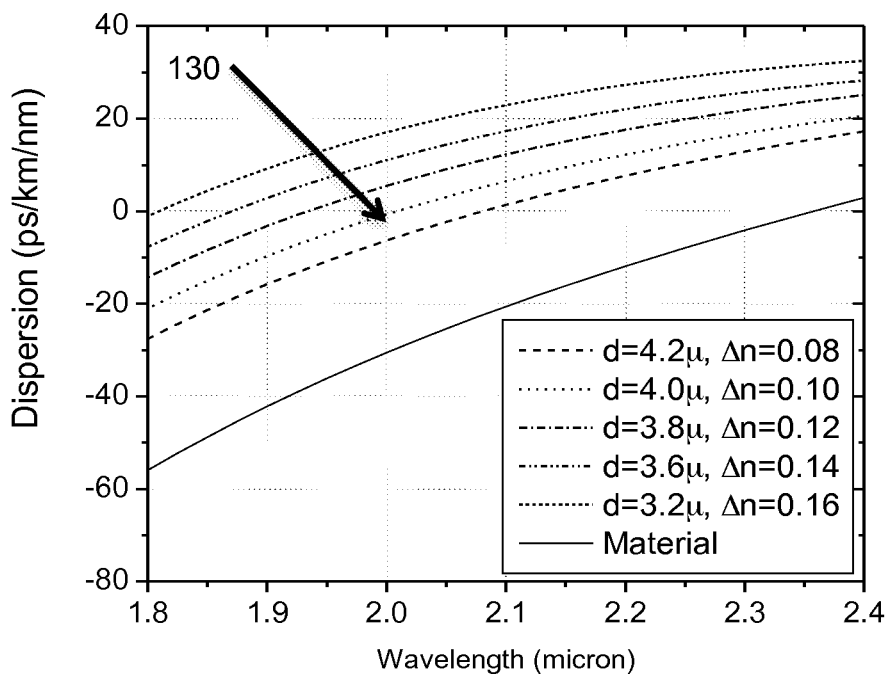

As shown in FIGS. 10a and 10b, the dispersion 130 of the depressed inner clad fiber with different $\Delta n$ and core sizes, S=b/a=2.0, and R=−0.3 is flattened and exhibits ZDWs from 1.80 to 2.1 micron. The fiber's ZDQ can be shifted to pump wavelengths in the spectral region larger than 1.8 microns with $\Delta n=n_1-n_2$ up to 0.16 for tellurite glasses. The zero material dispersion wavelengths (ZMDW) of tellurite glasses are in the range from 2 to 2.5 micron, and it is impossible to shift ZDW shorter than ZMDW in single-clad single-mode fibers. Dispersions in this design of supercontinuum fiber are also very flat ($|\Delta D|$<20 ps/km/nm over wavelength range 2 to 5 microns) compared with $|\Delta D|$<200 ps/km/nm of single-clad SM fibers.

Figure 11A:
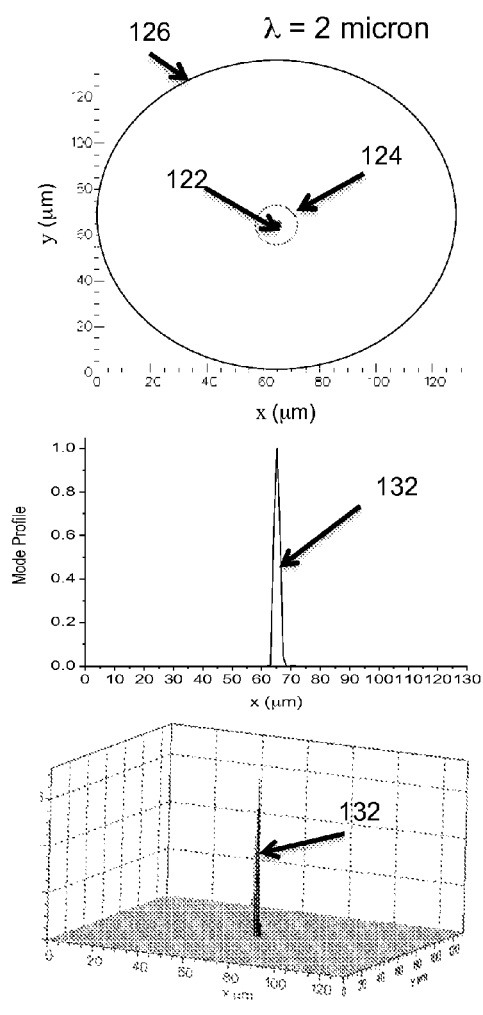
FIGS. 11a and 11b are plots illustrating the strong confinement of the light fields for the pump signal and the generated supercontinuum in a single transverse spatial mode.
Figure 11B:
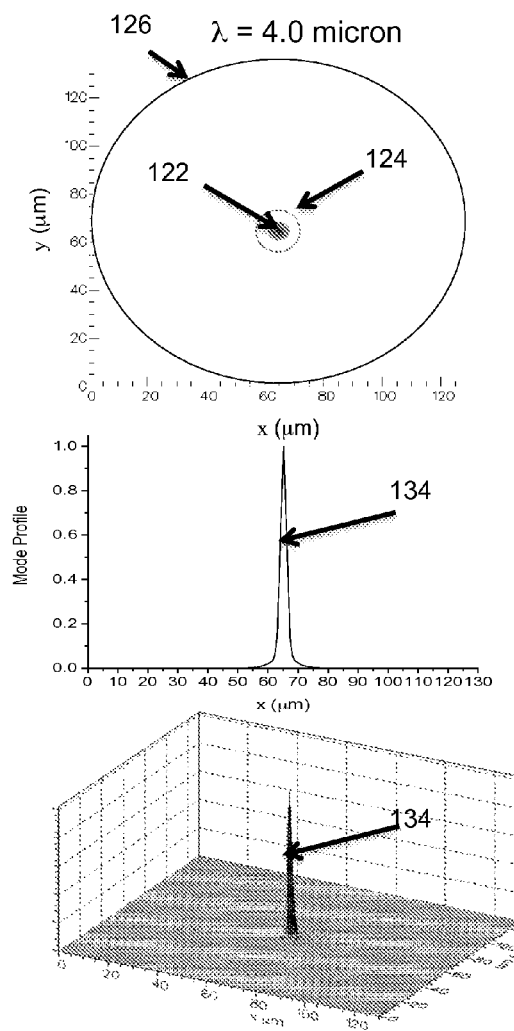
Figure 12:
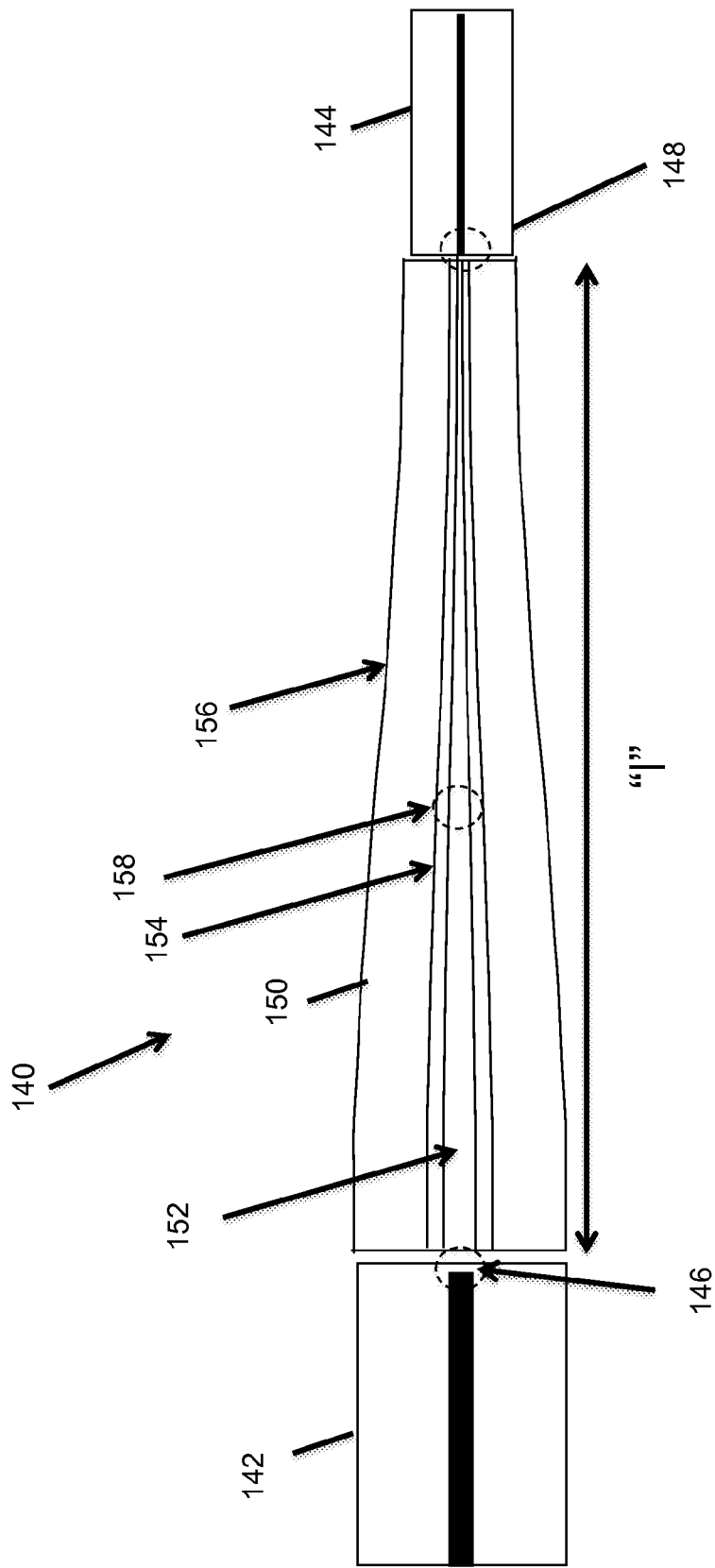
FIG. 12 is a diagram of a tapered fiber coupler for coupling the pump signal to the supercontinuum fiber.

As shown in FIGS. 11a and 11b, the depressed inner clad fiber exhibits strong confinement of both the pump 132 at 1.94 micron and the supercontinuum spectrum in the mid IR from 2 to 5 micron as exhibited by supercontinuum 134 at 4 micron. Strong confinement is needed to maximize the non-linear effect.

Referring now to FIGS. 12, 13 and 14a and 14b, in an embodiment the coupler may comprise a tapered depressed inner clad fiber coupler 140 that is fusion spliced between a pump 142 and a supercontinuum fiber 144. Pump 142 is configured to produce an optical pulsed pump signal in a given output MFD 146. To maximize pump power, the fiber core and MFD are typically relatively large, e.g. at least 10 micron. The pump signal is also preferably single-mode. Supercontinuum fiber 144 is configured to receive a single-mode optical pulsed pump signal in a given input MFD 148. To ensure single-mode guidance and to provide a high intensity, the MFD is typically relatively small, e.g. less than 5 micron. In this configuration, the input MFD of the supercontinuum fiber 144 is smaller than the output MFD of the pump 142.

Tapered depressed inner clad fiber coupler 140 comprises a coupler fiber 150 having a core 152, a first cladding 154 surrounding the core and a second cladding 156 surrounding the first cladding, The core, first cladding and second cladding having refractive indices n0, n1 and n2, respectively, in which n1<n2<n0. The coupler fiber may include additional claddings. Coupler fiber 150 is configured with a physical taper such that a radius of the core 152 tapers from a radius "a" to a smaller radius a' such that 2a≈the output MFD 146 of the pump and 2a'≈the input MFD 148 of the supercontinuum fiber. The fiber is configured with indices of refraction n0 and n2 that define a numerical aperture (NA) to support propagation of the optical signal in only a single transverse spatial mode within the spectral band (see equation 1 above). The length "l" of the physical taper of the fiber is configured so that the MFD 158 tapers smoothly (e.g. adiabatically) from the approximately the output MFD 146 to approximately the input MFD 148. The fiber is configured with index of refraction n1 and a first cladding radius that tapers from a radius b to b' so that the taper of the MFD 158 approximates the physical taper of the core 152.

Note, the tapered fiber coupler 140 could have higher coupling losses than a single clad fiber if the coupler is not properly designed in the taper section. The refractive index contrast $\Delta n$ and $\Delta n'$, and the ratio between inner cladding and core S=b/a must be carefully chosen to minimize loss into the clad. If not properly designed the MFD of the coupler will not follow the physical taper of the core but will instead expand and spread light into the cladding.

Figure 13:
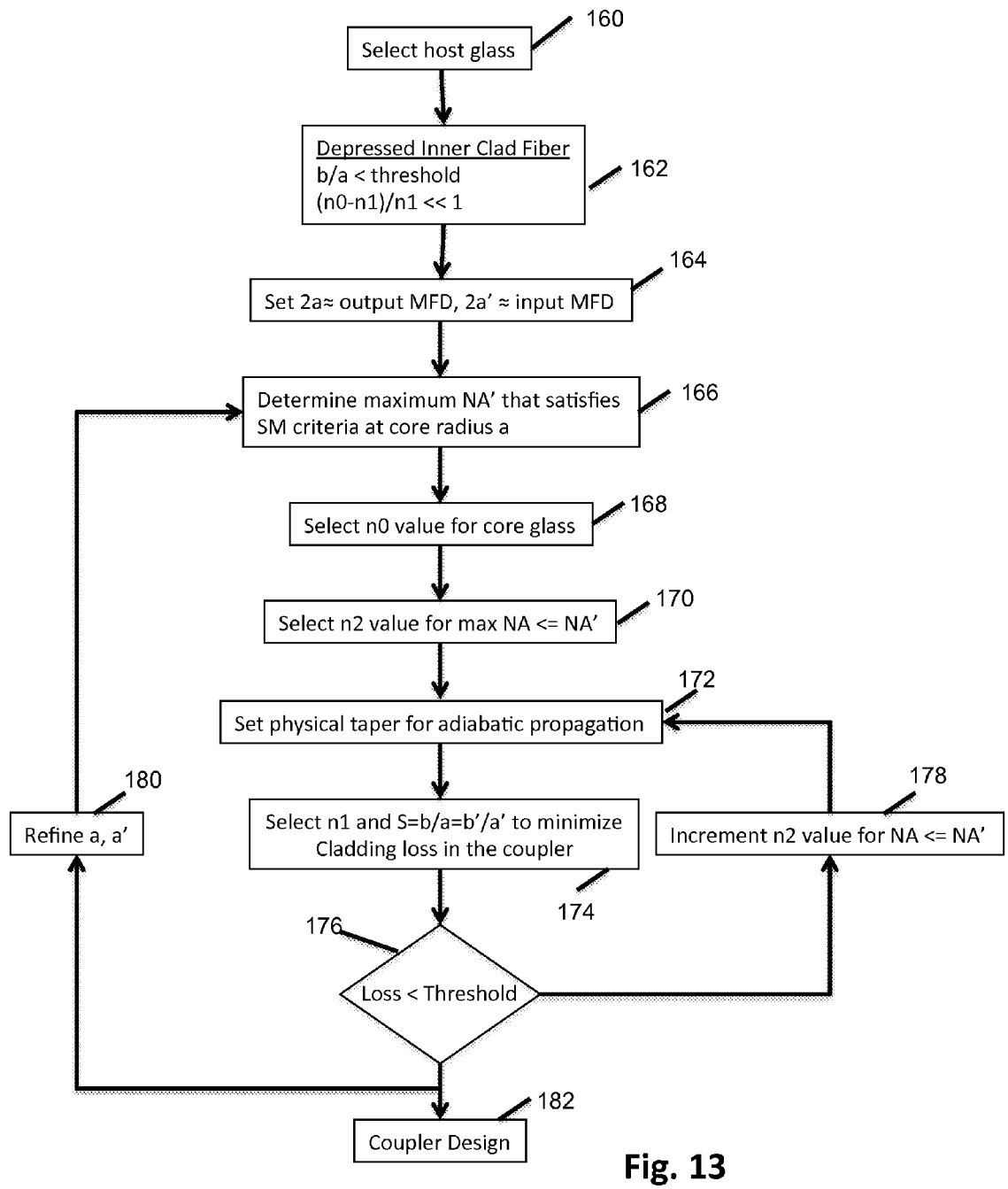
FIG. 13 is a flow diagram of an embodiment of a method for designing the tapered fiber coupler.

Referring now to FIG. 13, an embodiment of a design process for configuring the tapered fiber coupler starts with selecting the host glass for the fiber (step 160). The host glass should be selected to minimize losses at the pump wavelength and to minimize reflection losses at the fused interfaces between the coupler and the pump and the coupler and the supercontinuum fiber. For a depressed inner clad fiber, the designer assumes that a ratio of the radius of the first cladding b to the radius of the core a is less than some threshold, e.g. 4.5, and assumes that the fiber satisfies the weak guiding condition of (n0−n1)/(n1)<<1 (step 162).

Twice the core radius "a" is set to approximately equal the output MFD of the pump and twice the core radius a is set to approximately equal the input MFD of the supercontinuum fiber (step 164). This serves to reduce the losses at the interfaces to the coupler. The designer determines the maximum numerical aperture (NA) that satisfies the single-mode criteria at the input core radius a (step 166). For a depressed inner clad fiber the V number is given by equation 1 above. From this one can calculate the maximum $NA=\sqrt{n_0^2-n_2^2}$. The designer selects the index of refraction n0 for the core (step 168) and selects the smallest index of refraction n2 such that the actual numerical aperture NA<NA' (step 170) to ensure single-mode guidance throughout the coupler.

The designer sets the length "l" of the physical taper for adiabatic propagation of the light field of the pump throughout the coupler (step 172). In lay terms, the physical taper is sufficiently gradual that the light field changes slowly enough that light does not leak into the cladding. The designer selected a value for index of refraction n1 and the ratio S=b/a=b'/a' so that the taper of the MFD in the coupler follows the physical taper of the core of the coupler to minimize loss of light into the cladding (step 174). This can be done by simulating the MFD along the length of the coupler and determining the percentage of overlap with the core. Proper selection of n1 and S will maximize this overlap.

The designer calculates the total loss for the coupler design including reflection losses and MFD mismatch losses at the interfaces to the coupler and propagation losses into the coupling and compares the total loss to a threshold (step 176). If the loss is not less than the threshold, the designer increments the refractive index n2 such that the NA<NA' (step 178) and repeats steps 172, 174 and 176 until the threshold condition is satisfied. Once the condition is satisfied, the designer may or may not elect to refine the core diameters a and a' and repeat the design process to try to find a design that satisfied a global minimum for loss (step 180). Once an acceptable loss is found, the coupler design is finished (step 182)

Figure 14A:
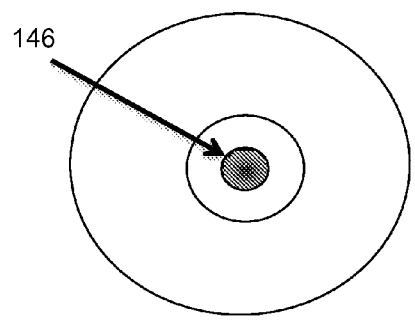
FIGS. 14a and 14b are plots illustrating the strong confinement of the light fields for the pump signal in a single transverse spatial mode in different MFDs at opposite ends of the coupler.
Figure 14A:
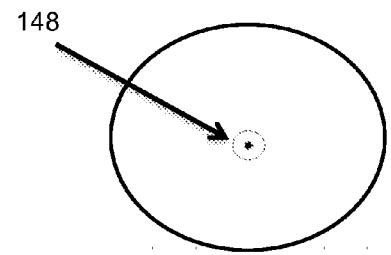
Figure 14A:
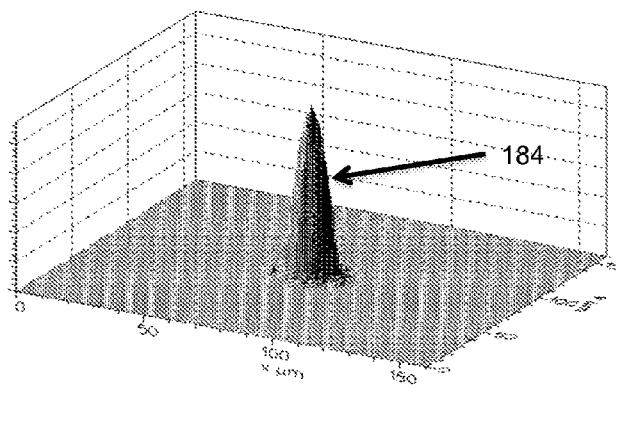
Figure 14B:
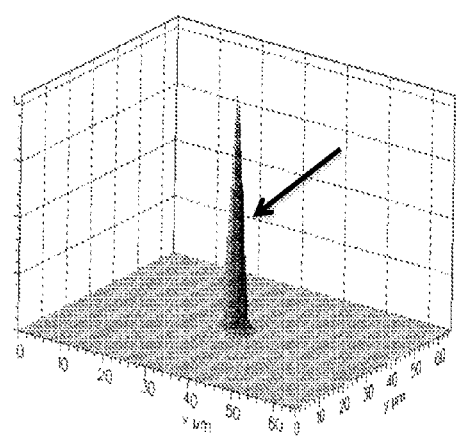

As shown in FIGS. 14a and 14b, the tapered depressed inner clad fiber coupler exhibits strong confinement of the pump 184 at the interface between the pump and coupler (FIG. 14a) where the MFD 146 approximately equals 2a and at the interface between the coupler and the supercontinuum fiber (FIG. 14b) where the MFD 148 approximately equals 2a. Strong confinement is needed to efficiently couple the pump signal from the pump to the supercontinuum fiber.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An oxide glass composition for transmission of light over an IR spectral band having an upper edge of at least 3.5 microns, comprising:
    a network former of 45 to 90 mole percent of an oxide formed from Tellurium (Te), Lead (Pb), Tantalum (Ta), Bismuth (Bi), Gallium (Ga), Antimony (Sb), Arsenic (As), or combinations thereof,
    a glass intermediate or modifier of 0.2 to 45 mole percent of an oxide formed from Lanthanum (La), Thallium (Tl), Yttrium (Y), Tantalum (Ta), Bismuth (Bi), Gallium (Ga), Antimony (Sb), Arsenic (As), Titanium (Ti), Zirconium (Zr), Magnesium (Mg), Calcium (Ca), Strontium (Sr), Barium (Ba), Zinc (Zn), Lead (Pb) or Cadmium (Cd) or combinations thereof, and a non-zero amount of halide less than 0.5 mole percent, wherein said network former, intermediate or modifier, and any said halide or any other passive glass constituent of at least 0.2 mole percent each have an absorption wavelength corresponding to an energy of the third phonon peak that is approximately at or longer than the upper edge of the IR spectral band, wherein said heavy metal oxide glass is substantially free comprising less than 0.1 mole percent of Hydroxide (OH—), said glass exhibiting an optical loss of less than 2 dB/m from 0.6 microns to 4.5 microns.

2. The oxide glass composition of claim 1, wherein the absorption wavelengths corresponding to the energy of the third phonon peak for the intermediate or modifier, and any said halide or any other passive glass constituent of at least 0.2 mole percent are longer than the absorption wavelength corresponding to the energy of the third phonon peak for the network former.

3. An oxide glass composition for transmission of light over an IR spectral band having an upper edge of at least 3.5 microns, comprising:

a network former of 45 to 90 mole percent of an oxide formed from Tellurium (Te), Lead (Pb), Tantalum (Ta), Bismuth (Bi), Gallium (Ga), Antimony (Sb), Arsenic (As), or combinations thereof, a glass intermediate or modifier of 0.2 to 45 mole percent of an oxide formed from Lanthanum (La), Thallium (Tl), Yttrium (Y), Tantalum (Ta), Bismuth (Bi), Gallium (Ga), Antimony (Sb), Arsenic (As), Titanium (Ti), Zirconium (Zr), Magnesium (Mg), Calcium (Ca), Strontium (Sr), Barium (Ba), Zinc (Zn), Lead (Pb) or Cadmium (Cd) or combinations thereof, and a non-zero amount of halide less than 5 mole percent, wherein said network former, intermediate or modifier, and any said halide or any other passive glass constituent of at least 0.2 mole percent each have an absorption wavelength corresponding to an energy of the third phonon peak that is approximately at or longer than the upper edge of the IR spectral band, wherein said heavy metal oxide glass is substantially free of Hydroxide (OH—).

4. The oxide glass composition of claim 3, wherein the absorption wavelengths corresponding to the energy of the third phonon peak for the intermediate or modifier, and any said halide or any other passive glass constituent of at least 0.2 mole percent are longer than the absorption wavelength corresponding to the energy of the third phonon peak for the network former.

5. The oxide glass composition of claim 3, wherein the glass composition has a non-linearity over the spectral band sufficient for supercontinuum generation.

6. The oxide glass composition of claim 3, wherein the glass is in the form of an optical fiber.

7. The oxide glass composition of claim 3, wherein the upper edge is at least 4.5 microns, wherein said network former is Tellurium oxide and the intermediate is Lanthanum oxide.

8. The oxide glass composition of claim 3, wherein the upper edge is at least 5 microns, wherein said network former is one of Pb/Bi, Pb/Ga, Pb/Ga/Bi, Ta/Ga, K/La/Ga or Te.

9. The oxide glass composition of claim 3, wherein the upper edge is at least 5.5 microns, wherein said network former is one of Pb/Bi, Pb/Ga, Pb/Ga/Bi or Ta/Ga.

10. The oxide glass composition of claim 3, wherein the upper edge is at least 6.5 microns, wherein said network former is one of Pb/Bi, Pb/Ga or Pb/Ga/Bi.

11. The oxide glass composition of claim 3, wherein the upper edge is at least approximately 7 microns, wherein said network former is a combination of lead (Pb) and bismuth (Bi) oxide.

12. An oxide glass composition for transmission of light over an IR spectral band having an upper edge of at least 3.5 microns, comprising:

a network former of 45 to 90 mole percent of an oxide formed from Tellurium (Te), Lead (Pb), Tantalum (Ta), Bismuth (Bi), Gallium (Ga), Antimony (Sb), Arsenic (As), or combinations thereof, and a glass intermediate or modifier of 0.2 to 45 mole percent of an oxide formed from Lanthanum (La), Thallium (Tl), Yttrium (Y), Tantalum (Ta), Bismuth (Bi), Gallium (Ga), Antimony (Sb), Arsenic (As), Titanium (Ti), Zirconium (Zr), Magnesium (Mg), Calcium (Ca), Strontium (Sr), Barium (Ba), Zinc (Zn), Lead (Pb) or Cadmium (Cd) or combinations thereof, wherein said network former, intermediate or modifier, and any other passive glass constituent present in the glass composition of at least 0.2 mole percent each having an absorption wavelength corresponding to an energy of the third phonon peak that is longer than the upper edge of the IR spectral band, wherein said heavy metal oxide glass is substantially free of Hydroxide (OH—).

13. The oxide glass composition of claim 12, wherein substantially free is less than 0.1 mole percent OH—.

14. The oxide glass composition of claim 12, wherein the absorption wavelengths corresponding to the energy of the third phonon peak for the intermediate or modifier, and any said halide or any other passive glass constituent of at least 0.2 mole percent are longer than the absorption wavelength corresponding to the energy of the third phonon peak for the network former.

15. The oxide glass composition of claim 12, wherein the glass composition exhibits an optical loss of less than 2 dB/m from 0.6 microns to 4.5 microns.

16. The oxide glass composition of claim 12, wherein the upper edge is at least 4.5 microns, wherein said network former is Tellurium oxide and the intermediate is Lanthanum oxide.

17. The oxide glass composition of claim 12, wherein the upper edge is at least 5 microns, wherein said network former is one of Pb/Bi, Pb/Ga, Pb/Ga/Bi, Ta/Ga, K/La/Ga or Te.

18. The oxide glass composition of claim 12, wherein the upper edge is at least 5.5 microns, wherein said network former is one of Pb/Bi, Pb/Ga, Pb/Ga/Bi or Ta/Ga.

19. The oxide glass composition of claim 12, wherein the upper edge is at least 6.5 microns, wherein said network former is one of Pb/Bi, Pb/Ga or Pb/Ga/Bi.

* * * * *